(12) United States Patent
Inabata et al.

(10) Patent No.: US 6,631,391 B1
(45) Date of Patent: Oct. 7, 2003

(54) PARALLEL COMPUTER SYSTEM AND PARALLEL COMPUTING METHOD

(75) Inventors: Shinjiro Inabata, Nakai-machi (JP); So Yamada, Nakai-machi (JP); Nobuaki Miyakawa, Nakai-machi (JP); Takashi Amisaki, Yonago (JP); Hajime Takashima, Ohmiya (JP); Kunihiro Kitamura, Ohmiya (JP)

(73) Assignees: Fuji Xerox Co., Ltd., Tokyo (JP); Taisho Pharmaceutical Co., Ltd., Tokyo (JP)

( * ) Notice: Subject to any disclaimer, the term of this patent is extended or adjusted under 35 U.S.C. 154(b) by 0 days.

(21) Appl. No.: 09/544,359

(22) Filed: Apr. 6, 2000

(30) Foreign Application Priority Data

Apr. 9, 1999 (JP) ............................................. 11-102020

(51) Int. Cl.[7] ................................................. G06F 7/38
(52) U.S. Cl. ....................................... 708/495; 708/501
(58) Field of Search ................................ 708/204, 495, 708/496, 497, 501, 523; 712/26

(56) References Cited

U.S. PATENT DOCUMENTS

| | | | | |
|---|---|---|---|---|
| 4,511,990 A | * | 4/1985 | Hagiwara et al. | ........... 708/501 |
| 5,341,506 A | * | 8/1994 | Nohmi et al. | ................. 712/26 |
| 5,631,859 A | | 5/1997 | Markstein et al. | |
| 6,026,422 A | * | 2/2000 | Yamada et al. | ............. 708/523 |

FOREIGN PATENT DOCUMENTS

| JP | A-2-171923 | 7/1990 |
|---|---|---|
| JP | A-6-301710 | 10/1994 |
| JP | A-8-185309 | 7/1996 |
| JP | A-9-050428 | 2/1997 |

OTHER PUBLICATIONS

S. Fujinaga et al., *Molecular Orbit Method*, pp. 93–125, 1980.
E. Osawa et al., *Molecular Orbit Method*, pp. 116–122, 1994.
O. Kikuchi et al., *Basics of Quantum Chemistry*, pp. 52–57, 1997.
S. Obara et al., *Efficient recursive computation of molecular integrals over Cartesian Gaussian functions*, J. Chem. Phys., pp. 84 (7), Apr. 1986.
S. Shirakawa et al., *The Architecture of a Molecular Orbital calculation Engine (MOE)* Technical Report of IEICE, CPSY99–46, (May 1996).
*IEEE Standard for Binary Floating–Point Arithmetic*, 1985.

* cited by examiner

Primary Examiner—Chuong Dinh Ngo
(74) Attorney, Agent, or Firm—Oliff & Berridge, PLC

(57) ABSTRACT

There is provided a parallel computer and a parallel computing method which allows high precision parallel calculation to be executed without requiring a hardware scale while maintaining high calculation speed. A system is constructed by connecting a host processor with a plurality of special purpose processors via buses. The host processor carries out the operation in a format of double-precision floating-point and the special purpose processor carries out the operation in an internal format of floating-point. The special purpose processor comprises an input data converting section for converting from the double-precision to the internal format and an output data converting section for converting from the internal format to the double-precision. Because the sign part and the exponent part can use data in common in the data before and after the conversion, only the mantissa part is converted by a specific procedure.

10 Claims, 7 Drawing Sheets

FIG. 3A

EXPRESSION OF DOUBLE-PRECISION OF IEEE STANDARD 754

(BIT NUMBER)   1    11           52

| s | e | f0 |

$v = (-1)^s \times 2^{e-1023} \times (1 + f0 \times 2^{-52})$      $(0 < e < 2047)$ $= \text{NaN (UNDEFINED)}$     $(e = 2047, f0 \neq 0)$ $= (-1)^s \times \infty$     $(e = 2047, f0 = 0)$ $= (-1)^s \times 2^{e-1022} \times (f0 \times 2^{-52})$     $(e = 0, f0 \neq 0)$ $= 0$     $(e = 0, f0 = 0)$

FIG. 3B

EXPRESSION OF FORMAT WITHIN 76 BITS IN SPECIAL PURPOSE PROCESSOR 2

(BIT NUMBER)   1    11           64

| s | e | f1 |

$v = (-1)^s \times 2^{e-1023} \times (1 + f1 \times 2^{-64})$     $(0 < e < 2047)$ $= (-1)^s \times \infty$     $(e = 2047)$ $= 0$     $(e = 0)$

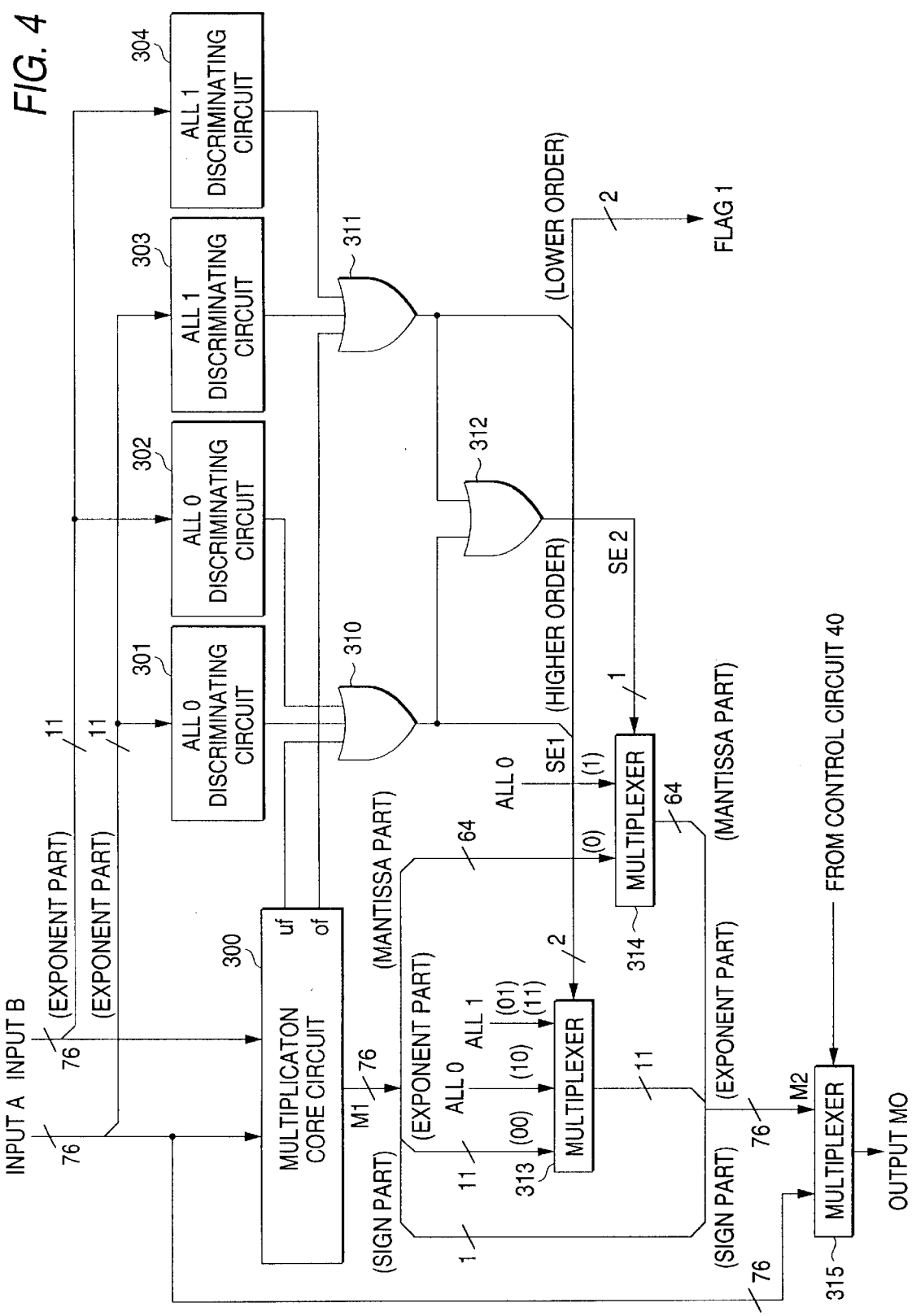

FIG. 6

EXPRESSION OF FORMAT WITHIN 76 BITS IN SPECIAL PURPOSE PROCESSOR 2

(BIT NUMBER)   1    11                    64

| s | e | f2 |

$v = (-1)^S \times 2^{e-1022} \times (f2 \times 2^{-64})$    $(0 < e < 2047)$ $\phantom{v} = (-1)^S \times \infty$    $(e = 2047)$ $\phantom{v} = 0$    $(e = 0)$

FIG. 7

| STEP NO. | | | INFLUENCE OF RELATIVE ERROR |
|---|---|---|---|
| 1. | $\zeta = \zeta a + \zeta b$ | (EQUATION (19)) | $(1 + \varepsilon)$ |
| 2. | CALCULATE OF $1/\zeta$ | (PART OF EQUATION (21)) (USE NEWTON METHOD) | $(1 + \varepsilon)^9$ |
| 3. | $Px = (\zeta a \times Ax + \zeta b \times Bx) \times (1/\zeta)$ | (REMAINING PART OF EQUATION (21)) | $(1 + \varepsilon)^3$ |
| 4. | CALCULATE OF $(Px - Qx)^2$ | (PART OF EQUATION (26)) | $(1 + \varepsilon)^3$ |
| 5. | $(Px - Qx)^2 + (Py - Qy)^2 + (Pz - Qz)^2$ | (PART OF EQUATION (26)) | $(1 + \varepsilon)^2$ |
| 6. | $\zeta + \eta$ | (PART OF EQUATION (24)) | $(1 + \varepsilon)$ |
| 7. | CALCULATE OF $1/(\zeta + \eta)$ | (PART OF EQUATION (24)) (USE NEWTON METHOD) | $(1 + \varepsilon)^9$ |
| 8. | $\rho = \zeta \times \eta \times (1/(\zeta \times \eta))$ | (EQUATION (24)) | $(1 + \varepsilon)^2$ |
| 9. | $T = \rho \times (P - Q)^2$ | (EQUATION (26)) | $(1 + \varepsilon)$ |
| 10. | CALCULATE OF $Fm(T)$ | (EQUATION (28)) (USE TAILOR'S EXPANSION) | $(1 + \varepsilon)^{24}$ |

PARALLEL COMPUTER SYSTEM AND PARALLEL COMPUTING METHOD

BACKGROUND OF THE INVENTION

1. Field of the Invention

The present invention relates to a parallel computer system for use in analysis of physical phenomena containing a large number of high precision sum of products operations by way of floating-point arithmetic operation including non-empirical calculation of molecular orbit used in designing the molecular structure of medicines and in prediction of physical properties.

2. Description of the Related Art

Along with the micronization and the increase of speed of semiconductor devices, high performance computers have come to be realized and molecular simulations using non-empirical calculation of molecular orbits have come to be conducted also in the fields of design of molecular structure and of prediction of values of physical properties in pharmacology.

Among the non-empirical calculations of molecular orbits, Hartree-Fock (HF) method which requires a relatively less amount of calculation and which can fully accommodate with qualitative analysis has been most widely used. The HF method has been described in Shigeru Fujinaga, "Molecular Orbit Method" Iwanami Shoten, 1980, in Eiji Osawa, "Molecular Orbital Method", Kodansha Scientific, 1994, and in Osamu Kikuchi, "Basics of Quantum Chemistry" Asakura Shoten, 1997 for example. The outline of the HF method will be described below.

The HF method is formulated as a method for solving Fock equation by a SCF method described later. Here, the Fock equation may be expressed by the following expression which is obtained as a result of implementing one-electron approximation or linear approximation to Schroedinger equation for the whole molecule:

$$FC = SC\,\epsilon \qquad (1)$$

where, N is a total number of atomic orbits contained in the molecule and m is a total number of molecular orbits expressed by linear approximation of the atomic orbits. Because energy of the molecule may be found by solving this Fock equation, it is possible to judge whether the molecule is stable or not by its value.

In the equation (1), F is a matrix of N×N called a Fock matrix, S is a matrix of N×N called an overlapping matrix, C is a matrix of N×m representing a coefficient and $\epsilon$ is a diagonal matrix of m×m representing energy of each electron occupying the molecular orbit.

Here, an element Frs (r, s=1 to N) of the Fock matrix may be expressed by the following equation:

$$Frs = hrs + grs = hrs + \Sigma[t, u=1 \sim N]Ptu((rs, tu) - (\tfrac{1}{2})(rt, su)) \qquad (2)$$

hrs in this equation (2) is an integral amount representing energy to one electron and is calculated by a number proportional to $N^2$ in one time of calculation of the equation (1).

It is noted that in this specification, $\Sigma[i, j=1 \text{ to } N] f(i, j)$ indicates an arithmetic operation for finding a total sum from 1 to N for i and j with respect to a function f(i, j). $\Sigma[i=1 \text{ to } N]f(i)$ indicates an arithmetic operation for finding a total sum from 1 to N for i with respect to a function f(i).

Ptu in the equation (2) is called a density matrix and is expressed as follows by using the above-mentioned matrix C:

$$Ptu = \Sigma(j=1 \sim m)Cfj \cdot Cuj \qquad (3)$$

(rs, tu) (r, s, t, u=1 to N) in the equation (2) is a physical amount called two-electron integral and is represented as follows by using the atomic orbit $x_i(r)(i=1 \text{ to } N, r$ is a coordinate):

$$(rs, tu) = \int \int xr(r1)xs(r1)(1/r12)xxt(r2)xu(r2)dr1 \cdot dr2 \qquad (4)$$

Here, r1 and r2 are coordinate systems independent from each other and double integration is carried out across the respective whole spaces. r12 represents a distance between the coordinate systems r1 and r2. Because r, s, t and u exist by the number of atomic orbits, respectively, the two-electron integral is required by a number proportional to $N^4$ in one time of calculation of the equation (1).

The element Srs of the overlapping matrix S may be represented by the following equation:

$$Srs = \int xr(r1)xs(r1)dr1 \qquad (5)$$

Because the HF method is represented as described above, it is a question of finding m characteristic values $\epsilon i$ and characteristic vector Ci (i=1 to m) represented by the equation (1). However, as it is apparent from the equations (2) and (3), because the Fock matrix contained in the equation (1) may be found by using the vector Ci representing a coefficient, the value of F cannot be found unless Ci obtained by solving the equation (1) is used.

Accordingly, new Ci is found by setting an adequate value as the initial guess of Ci at first, by finding F by using that Ci and by solving the question of the characteristic value of the equation (1). Then, the equation (1) is solved by calculating new F by using this Ci. This calculation is carried out repeatedly and is ended at last when there is almost no difference between the Ci used in the calculation of F and the found Ci. This method is called as SCF (self-consistent field) method and is widely used in the calculation of molecular orbits.

Because a number of two-electron integrals represented by the equation (1) is proportional to fourth power of the total number N of the atomic orbit, the value of N amounts around 1000 and the number of two-electron integrals amounts to the fourth power of that, i.e., in the order of 100 trillions, when a molecule composed of around 100 atoms which often appears in the field of biology for example. Although a method of judging and cutting off ones whose value is small before calculating the two-electron integrals has been often used here, a number of two-electron integrals which need to be calculated is around 100 millions which is still an enormous amount of number.

Therefore, because there is no memory space for calculating and storing the two-electron integrals once even though the same two-electron integrals are used in each repetition of the SCF method, a direct method of calculating the two-electron integrals again per each repetition is normally used. Because the most of the calculation time is occupied by the calculation of the two-electron integrals in the calculation of molecular orbit of this direct method, it is important to increase the speed of this part.

Here, a Gaussian function which allows the two-electron integrals to be found analytically is normally used for the atomic orbit xi represented by the equation (4). As a method for calculating the two-electron integrals at high speed using the atomic orbit of this Gaussian function, there has been known a method shown in a document 1, "S. Ohara and A. Sakai, J. Chem. Phys. 84, 3963 (1986)"(hereinafter referred to as Ohara's method).

The Ohara's method is represented by a format of recurrence formula containing auxiliary integration by introducing a value of the auxiliary integration expanding the two-electron integral. One two-electron integral may be expressed by the format of sum of products arithmetic operation containing lower order auxiliary integral by this recurrence formula. The two-electron integral may be found by developing into a format containing only the lowest order auxiliary integral in accordance to the recurrence formula and by finding the higher order auxiliary integral sequentially by the sum of products arithmetic operation. A concrete calculation method of the Ohara's method will be shown below.

At first, the atomic orbit x represented by the Gaussian function is represented by the following equation in the Ohara's method:

$$x(r-R; n, \zeta)=(rx-Rx)^{nx}(ry-Ry)^{ny}\times(rz-Rz)^{nz}\exp[-\zeta(r-R)^2] \quad (6)$$

Here, r and R are vectors representing spatial positions. R in particular represents the center of atom. n is a vector composed of an integer greater than zero and is called as an orbital quantum number vector. This orbital quantum number vector has three components of nx, ny and nz of x, y and z similarly to r.

$\zeta$ is a constant called an orbital exponent which changes corresponding to the type of atom and orbit. The sum of three components of the orbital quantum number vector is called an orbital quantum number.

$$\lambda=nx+ny+nz \quad (7)$$

When the orbital quantum numbers $\lambda$ are 0, 1, 2 and 3, respectively, the corresponding Gaussian functions are called as s function, p function, d function and f function and are handled as wave functions corresponding respectively to a s orbit, p orbit, d orbit and f orbit of the atom.

The wave function to each orbit is approximated by a linear coupling of those functions. For instance, a wave function corresponding to is orbit of a hydrogen atom is represented by a linear coupling in which orbital exponent $\zeta$ takes several different kinds of values, wherein n=(0, 0, 0) in the equation (7). The type of $\zeta$ at this time is different depending on a base function system.

It is noted that when the orbital quantum number $\lambda$ is not 0, there exist a plurality of wave functions. In case of a d function in which the orbital quantum number $\lambda$ is represented by 2, there exist six kinds of wave functions of $dx^2$, $dy^2$, $dz^2$, dxy, dyz and dzx corresponding to the orbital quantum number vector n=(2, 0, 0), (0, 2, 0), (0, 0, 2), (1, 1, 0) (0, 1, 1) and (1, 0, 1).

Accordingly, when one d function is contained in the two-electron integral expressed by the equation (4), six kinds of two-electron integrals may be obtained corresponding those functions. Here, in the Gaussian function expressed by the equation (6), a set of the Gaussian function in which the orbital quantum number, the center coordinate R of the atom and the parameter $\zeta$ are the same is called as a shell. Accordingly, they are categorized according to the orbital quantum number $\lambda$ as p-shell, d-shell and the like and the d-shell contains six Gaussian functions for example.

It is noted that there is a case when the two-electron integral expressed by the left side of the equation (4) is represented by the type of the respective wave functions such as p and s like (p*s*, p*s*). In this case, '*' is given to the name of the type to distinct from the name of the wave function.

The first document described above shows a method for calculating the value of the two-electron integrals efficiently by a recursive equation when wave functions a, b, c and d contained in the two-electron integrals expressed by the equation (1) are represented by using the Gaussian function represented by the equation (3). According to the Ohara's method, an auxiliary physical amount of auxiliary integral (ab, cd)$^{(m)}$ (m is an integer greater than 0) is introduced to the two-electron integrals (ab, cd) to lead the recursive equation of the following format.

$$(ab, cd)=(ab, cd)^{(0)} \quad (8)$$

$$(a+1i, cd)^{(m)}=P0(ab, cd)^{(m)}$$
$$+P1(ab, cd)^{(m+1)}$$
$$+Ni(a)\times P2(a-1i, cd)^{(m)}$$
$$+Ni(a)\times P3(a-1i, cd)^{(m+1)}$$
$$+Ni(b)\times P4(ab-1i, cd)^{(m)}$$
$$+Ni(b)\times P5(ab-1i, cd)^{(m+1)}$$
$$+Ni(c)\times P6(ab, c-1id)^{(m+1)}$$
$$+Ni(d)\times P7(ab, cd-1i)^{(m+1)} \quad (9)$$

(where, i=x, y, z)

$$(ab, cd)^{(m)}=(s*s*, s*s*)^{(m)}$$
$$=P8\times K(A, B, \zeta a, \zeta b)\times K(C, D, \zeta c, \zeta d)\times Fm(T) \quad (10)$$

Here, the wave functions a, b, c and d are all the Gaussian functions expressed by the equation (6) and each has a specific orbital quantum number vector n. The symbol a+1i means a Gaussian function in which the value of i component (i=x, y, z) is increased by one among the orbital quantum number vector of the Gaussian function a. Accordingly, when a is a px function expressed by n=(1, 0, 0) for example, a+1x becomes a $dx^2$ function expressed by n=(2, 0, 0).

Further, the symbol a–1i means a Gaussian function in which the value of i component (i=x, y, z) is reduced by one among the orbital quantum number vector of the Gaussian function a. The symbol Ni(a) represents the i component of the orbital quantum number vector of the Gaussian function a. Accordingly, when the i component of the orbital quantum number vector of the wave function b is zero, the term related to b –1i in the equation (9) is zeroed.

A relational expression similar to the equation (9) may be lead also for (ab+1i, cd)$^{(m)}$, (ab, c+1id)$^{(m)}$ and (ab, cd+1i)$^{(m)}$ when the following relationship which holds for the auxiliary integral is utilized:

$$(ab, cd)^{(m)}=(ba, cd)^{(m)}=(cd, ab)^{(m)}=(dc, ab)^{(m)}$$

Still more, the coefficients P0 through P7 in the auxiliary integral of the equation (9) are parameters calculated from the coordinates A, B, C and D of the atomic nucleus, i.e., the center, and $\zeta a$, $\zeta b$, $\zeta c$ and $\zeta d$ corresponding to the orbital exponent $\zeta$ of the equation (6) of the wave functions a, b, c and d and are expressed by the following equations:

$$P0=Pi-Ai \quad (11)$$

$$P1=Wi-Pi \quad (12)$$

$$P2=1/(2\zeta) \quad (13)$$

$$P3=-\rho/(2\zeta^2) \quad (14)$$

$$P4=1/(2\zeta) \quad (15)$$

$$P5 = -\rho/(2\zeta^2) \tag{16}$$

$$P6 = 1/(2(\zeta+\eta)) \tag{17}$$

$$P6 = 1/(2(\zeta+\eta)) \tag{18}$$

where, $$\zeta = \zeta_a + \zeta_b \tag{19}$$

$$\eta = \zeta_c + \zeta_d \tag{20}$$

$$P = (\zeta_a A + \zeta_b B)/\zeta \tag{21}$$

$$Q = (\zeta_c C + \zeta_d D)/\eta \tag{22}$$

$$W = (\zeta P + \eta Q)/(\zeta+\eta) \tag{23}$$

$$\rho = (\zeta h/(\zeta+\eta)) \tag{24}$$

The coefficient P8, the parameter T and the function K (R0, R1, $\zeta$0, $\zeta$1) and the function Fm(T) forming the right side of the equation (10) may be expressed by the following relational expressions, respectively:

$$P8 = (\zeta+\eta)^{-1/2} \tag{25}$$

$$T = \rho(P-Q)^2 \tag{26}$$

$$K(R0, R1, \zeta 0, \zeta 1) = \{2^{1/2} \pi^{5/4}/(\zeta 0+\zeta 1)\} x \exp[-\{\zeta 0 \zeta 1/(\zeta 0+\zeta 1)\}(R0-R1)^2] \tag{27}$$

$$Fm(T) = (0 \text{ to } 1) \int t^{2m} \cdot \exp[-Tt^2] dt \tag{28}$$

Here, the function Fm(T) in the equation (28) is called an error function and the above-mentioned first document describes a method for calculating it by using Tailor expansion. It is noted that (0 to 1) S in the equation (28) denotes finite integration from 0 to 1.

The two-electron integral is represented recursively as shown in the equations (8) through (10) by the Ohara's method as described above, the target value of the two-electron integral may be obtained repeatedly applying the equation (9) to cause auxiliary integral by which the orbital quantum number is 0 to appear on the right side and by finding the auxiliary integral by which the orbital quantum number is 0 by using the equation (10).

It will be explained by exemplifying a case of finding two-electron integral (p*p*,s*s*), for example. Here, assume that four Gaussian functions contained in the two-electron integral are all included in the specific shell. At this time, because there exists three types of p functions of px, py and pz in accordance to its orbital quantum number vector as described before, there exist the following nine types of two-electron integrals to be found, (px*px*,s*s*), (px*py*,s*s*), (px*pz*,s*s*), (py*px*,s*s*), (py*py*,s*s*), (py*pz*,s*s*), (pz*px*,s*s*), (pz*py*,s*s*) and (pz*pz*,s*s*).

Here, a case of finding (px*py*,s*s*) among them will be explained. When it is expanded by the equations (8) and (9), the following relationships hold:

$$(px*py*, s*s*) = (px*py*,s*s*)^{(0)} = P0(s*py*,s*s*)^{(0)} + P1(s*py*,s*s*)^{(1)} \tag{29}$$

The auxiliary integral on the right side of the equation (29) takes a form in which only the second wave function is not s function. The similar expression with the equation (9) may be obtained for the auxiliary integral of this form by replacing the wave function as described above. Accordingly, the following two equations may be obtained by applying the auxiliary integral on the right side of the equation (29) again to the equation (9) and by expanding it:

$$(s*py*,s*s*)^{(0)} = P0'(s*s*,s*s*)^{(0)} + P1'(s*s*,s*s*)^{(1)} \tag{30}$$

$$(s*py*,s*s*)^{(1)} = P0''(s*s*,s*s*)^{(1)} + P1''(s*s*,s*s*)^{(2)} \tag{31}$$

Thus, all items could be expressed in the form of (s*s*, s*s*)$^{(m)}$. Next, (s*s*, s*s*)$^{(0)}$, (s*s*,s*s*)$^{(1)}$ and (s*s*,s*s*)$^{(2)}$ on the right side of the equations (30) and (31) are found by using the equation (10). Thereafter, (s*py*,s*s*)$^{(0)}$ and (s*py*,s*s*)$^{(1)}$ are found by substituting the value found at first to the right side of the equations (30) and (31) in the order opposite from the expansion. Further, it is applied to the right side of the equation (29) to obtain (px*py*,s*s*) = (px*py*,s*s*)$^{(0)}$ at last.

The remaining eight two-electron integrals may be found by expanding to the numerical expressions similar to the equations (29), (30) and (31). At this time, because (s*s*, s*s*)$^{(0)}$, (s*s*, s*s*)$^{(1)}$ and (s*s*, s*s*)$^{(2)}$ used in the equations (30) and (31) are always used, they may be utilized again without finding those values again. Still more, because the coordinates of the atomic nucleus and the value of $\zeta$ are the same in those two-electron integrals, the value of coefficient such as P0 and P1 used in the sum or products operation may be used almost in common.

When the four Gaussian functions contained in the two-electron integrals are thus contained in the specific shell, respectively, there exist many auxiliary integrals which can be utilized in common. Accordingly, the two-electron integrals using the Gaussian functions contained in the specific shell are normally calculated altogether. The value of the two-electron integral may be obtained by using the equations (8) through (10) in accordance to the above-mentioned procedure.

As described above, the calculation of two-electron integral is expressed by a repetition of arithmetic operation of sum of products of floating-point by which the value of (coefficient×auxiliary integral) is added to the value of the other auxiliary integral. At this time, the calculation of the error function in the equation (28) is expressed by Taylor expansion and the inverse number appearing in the equation (13) and others, the inverse number of square root appearing in the equation (25) and the calculation of exp appearing in the equation (27) may be also calculated by the known Newton method and Taylor expansion.

Because the Newton method and the Taylor expansion may be expressed by the repetition of the arithmetic operation of sum of products of floating-point, the calculation of the two-electron integral is a repetition of consecutive arithmetic operation of sum of products after all. Still more, because eight arithmetic operations of sum of products increase at maximum at one time of expansion by the equation (9), a number of arithmetic operation of sum of products required in calculating one two-electron integral also increases.

As described above, when the calculation of molecular orbit is carried out in accordance to the HF method, the two-electron integrals appearing in one time of repetition of the SCF calculation must be calculated by the arithmetic operation of sum of products of floating-point. An amount of this calculation is enormous from the aspects the number of two-electron integrals and of an amount of calculation required for calculating one two-electron integral.

Hitherto, there has been "The Architecture of a Molecular Orbital calculation Engine (MOE)"(Shirakawa et al., Technological Report of IEICE, CPSY96-46 (1996-05) (Second Document) as an example of carrying out the calculation of molecular orbits by high speed. This is what parallelizes the calculation of a plurality of two-electron integrals by utilizing that the calculation of two-electron integrals can be carried out independently more or less.

In the example of the second document, a plurality of processor elements are provided in a system to cause the respective processor elements to share a portion of the calculation of two-electron integrals. While the calculation of two-electron integral is carried out by the arithmetic operation of sum of products of floating-point based on the method of the Ohara's method, the process or element calculates up to grs among the Fock matrix expressed by the equation (2) and transmits its value to a host processor. Then, the host processor solve the characteristic problem expressed by the equation (1).

There is also one as disclosed in Japanese Patent Laid-Open No. Hei. 9-50428 as another example. In this example, there is provided a computer cluster composed of a plurality of mutually connected computers. Each computer calculates the two-electron integrals and the elements of the Fock matrix expressed by the equation (2) and sends its value to a vector computer. Then, the vector computer solve the characteristic problem expressed by the equation (1).

Because the enormous amount of arithmetic operation of sum of products of floating-points are carried out as described above in the calculation of the two-electron integrals and Fock matrix elements, errors occurring on the way of the arithmetic operation and the accuracy thereof are questioned. Then, the accuracy required for the calculation will be discussed at first.

Although it is difficult to uniformly determine the accuracy required for the calculation because the scale of the calculation of molecular orbits changes depending on the size of molecules and on the base system to be used, it is required to have an accuracy by which a relative error of values of the error function expressed by the equation (28) is smaller than about $10^{-15}$ as a criterion for having an enough accuracy in the result of the non-empirical calculation of molecular orbits according to the above-mentioned first document.

That is, a value of energy obtained by the calculation of molecular orbits using the error function becomes a practically enough accuracy in the end in carrying out the calculation of molecular orbits in a scale of specific range by calculating the error function by the accuracy of this range. Then, the accuracy will be estimated based on the criterion shown in the first document.

According to the floating-point representation of double-precision defined by "IEEE Standard for Binary Floating-Point Arithmetic", the length of mantissa part is 52 bits and the value of 1 of the highest order is not contained among them, so that it is considered to have an accuracy of 53 bits. Because this bit length is $2^{-53}=1.11\times10^{-16}$ in terms of relative error, the double-precision floating-point satisfies the above-mentioned accuracy.

Then, an accuracy to be satisfied in the arithmetic operation of sum of products will be estimated under the condition that the error function obtained in accordance to the equation (28) has the accuracy wherein the mantissa part has the accuracy of the double-precision arithmetic operation of sum of products of floating-point of 53 bits.

At this time, it is supposed that the inverse number calculation by means of the Newton method is used in the divisions used in the equations (21) through (24) and the calculation by means of the Taylor expansion will be used in the calculation of the error function of the equation (28) as described above. Accordingly, the value of the error function will be calculated by repeating the arithmetic operation of sum of products from the values of A, B, C, D, ζa, ζb, ζc and ζd given in advance.

According to "Nomenclature of Mathematics"(Iwanami Shoten), errors may be categorized into three errors of (1) input error, (2) truncation error, and (3) rounding error in general. Calculated values of the error function are considered to be influenced by these three types of errors. Then, the influence by these three errors will be explained below as a preparation for estimating the accuracy required for the arithmetic operation of sum of products.

The input error is an error already existing in data given in advance and refers to A, B, C, D, ζa, ζb, ζc and (d (called as initial parameters) expressed by floating-point. Here, assume that the initial parameters are given by the double-precision floating-point. Accordingly, these values have the accuracy of more than the mantissa part of 53 bits and the input error also falls in around this range.

Next, the truncation error is an error originating from truncating a number of times of repetition and a number of items of expansion by a finite number of times in approximating the division by the Newton method or the value of the equation (28) by the Taylor expansion as described above. This error may be controlled by increasing the number of times of repetition of the Newton method, the number of items of expansion of the Taylor expansion and the accuracy of initial values and values of coefficients. Accordingly, it is assumed that the truncation error may be reduced fully and similarly to the input error.

The rounding error is an error occurring in rounding a numerical value obtained at each stage of the calculation to a limited number of digits. Here, the rounding error occurs by repeatedly using the arithmetic operation of sum of products of the finite length of multiplication, addition and subtraction.

At this time, because it is assumed that the input error and the truncation error are fully small and are less than the error of the double-precision floating-point, the influence of those two types of errors given to the value of the error function is small. Then, the accuracy required for the arithmetic operation of sum of products may be calculated under the condition that the value of the calculated error function still maintains the accuracy of the double-precision floating-point having the 53 bit mantissa part even if only the rounding error is considered in this analysis and the rounding error accumulated in the repetition of the arithmetic operation of sum of products is considered.

Next, an elementary error of calculation used in the calculation of the error function will be estimated before concretely analyzing the accuracy of the error function.

At first, the relative error occurring in the addition and multiplication contained in the arithmetic operation of sum of products will be explained. The addition and multiplication causing the rounding error by rounding by a finite length of digit number will be denoted as +r and ×r for convenience and the addition and multiplication causing no rounding error by rounding by an infinite length of digit number will be denoted as +i and ×i for convenience in the following explanation. Further, for simplification, it is assumed that the relative error occurs only by the worst relative error E which occurs due to the computation of finite length uniformly by the addition and multiplication of finite length.

At this time, the finite length addition and multiplication between certain parameters A and B are expressed like the following equations (32) and (33):

$$A+rB=(1+\epsilon)(A+iB) \qquad (32)$$

$$A\times rB=(1+\epsilon)(A\times iB) \qquad (33)$$

When parameters X and Y are expressed as follows by using parameters A, B, C and D, the finite length addition and multiplication of X and Y are expressed like the following equations (36) and (37):

$$X = A + rB \tag{34}$$

$$Y = C + rD \tag{35}$$

$$X + rY = (A+rB) + r(C+rD) = (1+\epsilon)(A+iB) + r(1+\epsilon)(C+iD) = (1+\epsilon)^2((A+iB) + i(C+iD)) \tag{36}$$

$$X \times rY = (A+rB) \times r(C+rD) = (1+\epsilon)(A+iB) \times r(1+\epsilon)(C+iD) = (1+\epsilon)^3((A+iB) \times r(C+iD)) \tag{37}$$

Accordingly, when the finite length addition is carried out like the equation (36), the ideal result is raised to second power of the relative error and when the finite length multiplication is carried out like the equation (37), the ideal result is raised to third power of the relative error. Thus, how the relative error contained in the equation remains is different in case of the addition and of the multiplication in the computation among the equations containing the rounding error.

Further, in finding the accumulation of the parameters A through D, while the relative error is $(1+)^2$ in the method of finding X and Y at first and then of adding them like the equation (36), equations of a method of adding the parameters A through D one after another are expanded as shown in the following equation (38):

$$((A+rB)+rC)+rD = (1+\epsilon)^3 A + i(1+\epsilon)^3 B + i(1+\epsilon)^2 C + i(1+\epsilon) D \tag{38}$$

Accordingly, because the relative error is $(1+\epsilon)^3$ to A and B, the relative error is considered to be $(1+\epsilon)^3$ to the ideal result with regard to the whole of this equation. Thus, the rounding error changes also with regard to the order of the addition.

Next, the rounding error caused by the Newton method for finding a value of inverse number will be analyzed. In steps of the Newton method, an inverse number of a certain value y may be obtained by normalizing the value y in a specific range to select a value of x close to the inverse number thereof and by normalizing a calculated value of x obtained by repeating the following equations (39) through (41):

$$y0 = y \times x \tag{39}$$

$$r = 2 - y0 \tag{40}$$

$$x = r \times x \tag{41}$$

Because the number of times of repetition at this time depends on the difference between the value of x selected at first and the true value, the calculation depends on the accuracy of the initial value. Here, assume that a sufficient truncation error may be obtained when the number of times of repetition is 3. At this time, the relative error is multiplied with $(1+\epsilon)$ by one time each by carrying out the multiplication and addition of the equations (39) through (41) in finite length. Accordingly, the relative error occurring by the repetition of three times is $(1+\epsilon)^9$.

Because the Newton method is a method for approaching the value of x to $(1/y)$ by the repetition of the equations (39) through (41) described above, the rounding error mixed on the way of the repetition is also actually compensated. Therefore, although the value of the relative error of $(1+\epsilon)^9$ described above is over-estimated, this value will be used here by assuming the worst case.

Further, the rounding error in applying the Taylor expansion to the equation (28) will be analyzed. Because an example of expansion of the seventh item is shown in the first document described above, the expansion of the seventh item will be assumed here also. The Taylor expansion at this time is expressed by the following equation (42):

$$Fm(T) = \Sigma[k=0 \text{ to } 6] 1/k? \sim Ck(T-T') \tag{42}$$

Here, T' is a boundary value closest to T when the range of the given T is divided by a predetermined number of division. It is assumed that the number of division is fully large so that the truncation error of the Taylor expansion becomes small as described above. Ck is the value of a coefficient determined corresponding to the value of T'. This Taylor expansion is actually calculated in the following procedure:

$$F6 = (\tfrac{1}{6}) \times (T-T') \times C6 \tag{43}$$

$$F5 = (\tfrac{1}{5}) \times (T-T') \times (F6+C5) \tag{44}$$

$$F4 = (\tfrac{1}{4}) \times (T-T') \times (F5+C4) \tag{45}$$

$$Fm = F0 = (T-T') \times (F1+C0) \tag{46}$$

When the equations (43) through (46) are calculated by using the finite length addition and multiplication, the relative error related to the equation (43) is $(1+\epsilon)^3$ and the relative error related to the equations (44) and thereafter is $(1+\epsilon)^4$. However, because the first multiplication (one/integer) may be calculated accurately to F4, F2, F1 and F0, the relative error is $(1+\epsilon)^3$. As a result, the relative error caused by the Taylor expansion turns out to be $(1+\epsilon)^{24}$.

Because the number of division is taken to be fully large in the actual Taylor expansion as described above, the value of (T-T') in the equation (42) is fully small. Accordingly, there is a possibility that the coefficient C is fully greater than F with which (1/k) and (T-T') are multiplied right before and the value of the rounding error mixed in the value of F is no problem in the addition of the value F found right before and the coefficient C like (F6+C5) contained in the equation (44) for example. Therefore, the value of relative error of $(1+\epsilon)^{24}$ is overestimated, this value will be used here by assuming the worst case.

Still more, (T-T') is multiplied one time each in finding the equations (43) through (46). Therefore, although the relative error contained in T seems to be sixth power when mechanically analyzed, it is also over-estimated by the reason described above because this relative error is also mixed in the value of F in each stage of the repetition. However, the error contained in T is considered to be sixth power by assuming the worst case also here.

The rounding error occurring in the calculation of error function will be described while taking the relative error mixed in the elementary calculation of the error function described above into account. Although the over-estimated part is contained in the value of the rounding error emitted here, the value of estimated error will be used here as it is because the accuracy of the arithmetic operation of sum of products which is sufficient for causing the value of the error function to stay within a predetermined range of error is to be found here.

FIG. 7 shows a path for calculating an error function Fm(T) from the initial parameters A, B, C, D, ζa, ζb, ζc and ζd and a relative error occurring in each calculation. The figure shows the path for finding the error function from the initial parameters by sequentially using the arithmetic operation of sum of products by arrows and shows values of the relative error related to each arithmetic operation of sum of products on the right side of the equations.

The relative error contained in the value of T of the equation (26) will be discussed at first. Here, because T is expressed by multiplication of two values of ρ and $(P-Q)^2$, the rounding error contained in those two values will be described here.

The relative error of $(P-Q)^2$ may be obtained by analyzing the path of Steps 1 through 5 in FIG. 7. The relative error of Px may be obtained by multiplying the relative errors in the respective Steps as they are and its value is $(1+\epsilon E)^{13}$.

Next, the value of Step 4 is in the form that the item containing Px is multiplied twice, the relative error is considered to be $((1+\epsilon)^{13})^2 \times (1+\epsilon)^3 = (1+\epsilon)^{29}$. Further, when the relative error in Step 5 is multiplied, the relative error turns out to be $(1+\epsilon)^{31}$. This value is the relative error of $(P-Q)^2$.

Next, the relative error of $\rho$ is taken into account by the path of Steps 1, 6, 7 and 8 and the path of Step 1 and 8. Because the relative error is $(1+\epsilon)^{11}$ in Steps 1, 6 and 7 and the relative error is a multiplication of the three in Step 8, the relative error turns out to be $(1+\epsilon)^{13}$ after all. This value is the relative error of r.

The relative error contained in T found in Step 9 is calculated to be $(1+\epsilon)^{31+13+1} = (1+\epsilon)^{45}$ from the relative errors of $\rho$ and of $(P-Q)^2$ found as described above.

The relative error contained in the error function in Step 10 is obtained from the relative error contained in T. When it is calculated based on the influence of the rounding error of the Taylor expansion described above, the relative error of the error function is $(1+\epsilon)^{45 \times 6 + 24} = (1+\epsilon)^{294}$.

Drop of digit caused by subtraction must be also taken into account in the actual analysis of errors. In this case, when a value of P is considerably close to a value of Q in a calculation of $(P-Q)$ contained in the equation (26), the effective number of digits in the result of subtraction decreases. However, when the drop of digit occurs in $(P-Q)$ the value of T also decreases in this case. As a result, the value of $(T-T')$ in the equation (42) is considered to be small and what influences the error function as a result is considered to be items which is not multiplied with $(T-T')$ containing C0 in the equation (42). Therefore, because the influence of the error is considered to be reduced when the drop of digit occurs, the drop of digit will not be taken into account this time.

The relative error caused by the rounding error which is mixed in calculating the error function from the initial parameters turns out to be $(1+\epsilon)^{294}$ as described above. Because this relative error is required to be less than the relative error contained in the double-precision floating-point from the condition to the rounding error described above, the following equation holds to one time of relative error $\epsilon$ by the arithmetic operation of sum of products:

$$(1+\epsilon)^{294} < (1+2^{-53}) \qquad (47)$$

Here, because the relative error $\epsilon$ is a number smaller than $2^{-53}$, $\epsilon << 294$. As a result, the left side of the equation (47) may be approximated as $1+294\epsilon$ and the equation (47) is deformed as $\epsilon \leq 2^{-62}$ in the end. From this conditional expression, a number of digits of the mantissa part of the arithmetic operator of sum of products which is sufficient for the error function to have the accuracy around the double-precision floating-point is 62 bits.

A common arithmetic unit is used in the calculation of the error function and the arithmetic operation of sum of products used in the calculation of the two-electron integrals and the Fock matrix elements normally in the case as described in the above-mentioned second document. Accordingly, the arithmetic operation of sum of products in which the mantissa part is greater than 62 bits is used not only in calculating the error function but also in obtaining the two-electron integrals and the Fock matrix elements.

Because the error function has the accuracy which is shown as the criterion in the first document by calculating it by the arithmetic operation of sum of products greater than 62 bits, it is considered that it is possible to give an enough accuracy also in the result of the calculation of molecular orbits.

However, in the method disclosed in the Japanese Patent Laid-Open No. Hei. 9-50428, the calculation of molecular orbits is carried out by using a vector computer, the existing host, and a general purpose computers which compose a computer cluster. Therefore, there has been a problem that the accuracy of the calculation of the error function or of the arithmetic operation of the characteristic value is limited by the operational accuracy prepared in advance for the host vector computer and the computers composing the cluster.

A multiplier circuit and adder/subtracter circuit corresponding to the representation of the double-precision floating-point defined in the IEEE Standard 754 are provided in the normal computers in particular, the operational accuracy is insufficient for the calculation of the error function even though the operational accuracy of the characteristic value expressed by the equation (1) satisfies the above-mentioned requirement.

Although it is possible to use computers provided with highly accurate arithmetic operation such as quadruple-precision floating-point, its efficiency is bad because it considerably exceeds the specification of the sufficient accuracy of arithmetic operation for the calculation of the error function and it uses the hardware resources wastefully.

Further, it takes time in the conversion of formats of the double-precision floating-point and the quadruple-precision floating-point defined in the IEEE Standard 754. For instance, while a value obtained by adding a specific offset to the value of exponent is stored in the field indicating the exponent in the double-precision floating-point and the quadruple-precision floating-point, a process of implementing an adding/subtracting process to the exponent part is required between them because the value of offset to be added is different among the double-precision floating-point and the quadruple-precision floating-point.

Still more, although it is possible to carry out highly accurate calculation such as the quadruple-precision floating-point by software by using hardware corresponding to the double-precision floating-point, its operating speed drops because it requires extra number of steps for the calculation.

Thus, although ones described in Japanese Patent Laid-Open Nos. Hei. 2-171923, Hei. 6-301710 and Hei. 8-185309 may be cited as examples of calculating a format by using a circuit smaller than the target format, all of them have had a problem that it takes time for the arithmetic operation.

SUMMARY OF THE INVENTION

The present invention has been made in view of the above circumstances and provides an apparatus and a method which require a hardware scale which does not exceed the specification and which allow highly accurate parallel calculation while maintaining high computing speed.

In order to solve the above-mentioned problems, according to a first aspect of the invention, a parallel computer system has a host processor and at least one processor element connected to the host processor via a bus. The host processor and the processor element share and calculate a floating point arithmetic operation contained in a specific calculation process. The processor element has a floating-point input/output interface section for inputting/outputting floating-point data having a first form composed of a 1-bit sign part, an exponent part having a bit width of me bits and a mantissa part having a bit width of m0 bits, an input data converting section for converting the floating-point data having the first form inputted from the floating-point input/output interface section into floating-point data having a second form composed of a 1-bit sign part, an exponent part having a bit width of me bits and a mantissa part having a bit width of m1 bits which is greater than m0, a floating-point operating section for executing the floating-point arithmetic operation for the floating-point data having the second form from the input data converting section, and an output data converting section for converting the floating-point data having the second form computed by the floating-point operating section into the floating-point data having the first form and for supplying it to the floating-point input/output interface section.

According to a second aspect of the invention, in the parallel computer system as described in the first aspect, the input data converting section converts the sign part of the floating-point data having the first form into the sign part of the floating-point data having the second form, the exponent part of the floating-point data having the first form into the exponent part of the floating-point data having the second form, and the mantissa part of the floating-point data having the first form of m0 bits into the higher order m0 bits within the mantissa part of the floating-point data having the second form of m1 bits and the lower order m1−m0 bits of the mantissa part of the floating-point data having the second form into a predetermined numerical value. The output data converting section converts the sign part of the floating-point data having the second form into the sign part of the floating-point data having the first form, the exponent part of the floating-point data having the second form into the exponent part of the floating-point data having the first form, and the higher order m0 bit of the mantissa part of the floating-point data having the second form into the mantissa part of the floating-point data having the first form.

According to a third aspect of the invention, in the parallel computer system as described in the first aspect, the input data converting section converts the sign part of the floating-point data having the first form into the sign part of the floating-point data having the second form, the exponent part of the floating-point data having the first form into the exponent part of the floating-point data having the second form, and the highest order 1 bit in the mantissa part of the floating-point data having the second form of m1 bits into 1, m0 bit which is lower than the highest order into the mantissa part of the floating-point data having the first form and the m1−m0−1 bit which is lower than that into a predetermined numerical value. The output data converting section converts the sign part of the floating-point data having the second form into the sign part of the floating-point data having the first form, the exponent part of the floating-point data having the second form into the exponent part of the floating-point data having the first form, and m0 bit from the second higher order bit of the mantissa part of the floating-point data having the second form into the mantissa part of the floating-point data having the first form of m0 bit.

According to a fourth aspect of the invention, in the parallel computer system as described in the first aspect, the floating-point data having the second form represents a signed infinite when the exponent part is a first predetermined value emax and represents zero when the exponent part is a second predetermined value emin. A floating-point multiplying unit contained in the floating-point operating section sets the exponent part of output data at the value emax when an overflow occurs, the exponent part of the output data at the value emin when an under-flow occurs, the exponent part of the output data at the value emax when either one exponent part of two pieces of the floating-point data having the second form to be inputted is the value emax, the exponent part of the output data at the value emin when the exponent parts of both of two pieces of the floating-point data having the second form to be inputted are not the value emax and when either one exponent part is the value emin. A floating-point adding/subtracting unit contained in the floating-point operating section sets the exponent part of output data at the value emax when an overflow occurs, the exponent part of the output data at the value emin when an under-flow occurs, and the exponent part of the output data at the value emax when either one exponent part of the two floating-point data having the second form to be inputted is the value emax.

According to a fifth aspect of the invention, in the parallel computer system as described in the first aspect, the floating-point multiplying unit contained in the floating-point operating section implements truncation in finding a mantissa part of the output data, and the floating-point adding/subtracting unit contained in the floating-point operating section implements truncation in finding a mantissa part of the output data.

According to a sixth aspect of the invention, a parallel computing method for sharing and calculating a floating-point arithmetic operation contained in a specific calculation process by a host processor and at least one processor elements connected to the host processor via a bus includes the steps of making the host processor execute an arithmetic operation of floating-point data having a first form composed of a 1-bit sign part, an exponent part having a bit width of me bits and a mantissa part having a bit width of m0 bits, making the processor element execute a floating-point arithmetic operation on floating-point data having a second form whose accuracy is higher than that having the first form and which is composed of a 1-bit sign part, an exponent part having a bit width of me bits and a mantissa part having a bit width of m1 bits which is greater than m0, converting the sign part of the floating-point data input having the first form into the sign part of the floating-point data having the second form via the bus; the exponent part of the floating-point data input having the first form into the exponent part of the floating-point data having the second form; and the mantissa part of the floating-point data input having the first form into higher order m0 bits within the mantissa part of the floating-point data having the second form of m1 bits and the lower order m1−m0 bits of the mantissa part of the floating-point data having the second form into a predetermined numerical value to convert the floating-point data input having the first form into the floating-point data having the second form, executing floating-point arithmetic operation on the floating-point data having the second form to obtain the floating-point data having the second form as a result of the arithmetic operation, and converting the sign part of the floating-point data having the second form as a result of the arithmetic operation into the sign part of the floating-point data having the first form; the exponent part of the floating-point data having the second form as a result of the arithmetic operation into the exponent part of the floating-point data having the first form; and the higher order m0 bit of the mantissa part of the floating-point data having the second form as a result of the arithmetic operation into the mantissa part of the floating-point data having the first form to convert the floating-point data having the second form as a result of the arithmetic operation into the floating-point data output having the first form and to output to the bus.

According to a seventh aspect of the invention, a parallel computing method for sharing and calculating a floating-point arithmetic operation contained in a specific calculation process by a host processor and at least one processor elements connected to the host processor via a bus includes the steps of making the host processor execute an arithmetic operation of floating-point data having a first form composed of a 1-bit sign part; an exponent part having a bit width of me bits; and a mantissa part having a bit width of m0 bits, making the processor element execute a floating-point arithmetic operation on floating-point data having a second form whose accuracy is higher than that having the first form and which is composed of a 1-bit sign part; an exponent part having a bit width of me bits; and a mantissa part having a bit width of m1 bits which is greater than m0, converting the sign part of the floating-point data input having the first form into the sign part of the floating-point data having the second form via the bus; the exponent part of the floating-point data input having the first form into the exponent part of the floating-point data having the second form; the highest order 1 bit in the mantissa part of the floating-point data having the second form of m1 bits into 1; and m0 bit which is lower than the highest order into the mantissa part of the floating-point data having the first form and the m1−m0−1 bit which is lower than that into a predetermined numerical value to convert the floating-point data input having the first form into the floating-point data having the second form, executing a floating-point arithmetic operation on the floating-point data having the second form to obtain the floating-point data having the second form as a result of the arithmetic operation, and converting the sign part of the floating-point data having the second form as a result of the arithmetic operation into the sign part of the floating-point data having the first form; the exponent part of the floating-point data having the second form as a result of the arithmetic operation into the exponent part of the floating-point data having the first form; and the higher order m0 bit from the host second bit of the mantissa part of the floating-point data having the second form as a result of the arithmetic operation into the mantissa part of the floating-point data having the first form to convert the floating-point data having the second form as a result of the arithmetic operation into the floating-point data output having the first form and to output to the bus.

According to an eighth aspect of the invention, in the parallel computer system as described in the first aspect, the calculation process is a process based on the molecular orbital method.

According to a ninth aspect of the invention, in the parallel computing method as described in the sixth or the seventh aspect, the calculation process is a process based on the molecular orbital method.

According to the first aspect of the invention, the host processor executes the arithmetic operation on the first form, e.g., the double-precision floating-point data, and the processor element which shares and processes the floating-point arithmetic operation together with the host processor executes the floating-point arithmetic operation by using the floating-point data having the second form whose accuracy is higher than that of the floating-point data having the first form and only whose bit width of the mantissa part is different. Accordingly, it will not cause no overspecification which otherwise occurs when the quadruple-precision is used.

Then, the input data converting section converts the form of the floating-point data from the first to the second in the processor element in receiving input data from the host processor and the output data converting section converts the form of the floating-point data from the second form to the first form in outputting data from the processor element to the host processor.

The conversion of the form of the floating-point data requires conversion of no exponent part like the conversion among the quadruple-precision and the double-precision because only the mantissa part is different. Therefore, the operating speed drops less because the conversion process can be simple.

Then, although an amount of calculation in the processor element is greater than that of the host processor in general in the parallel computer system, the arithmetic operation of the large amount of calculation is implemented at high precision, thus enabling highly accurate calculation by the first aspect as configured as described above. According to the second aspect of the invention, the sign part and the exponent part may be totally identical in the conversion of the floating-point data having the first form and the floating-point data having the second form carried out by the input data converting section and the output data converting section. Accordingly, the scale of hardware required for the conversion may be reduced because the conversion may be simplified.

According to the third aspect of the invention, the mantissa part of the floating-point data having the second form is changed so as to be readily calculated by the floating-point multiplying unit while keeping simple the conversion between the floating-point data having the first form and the floating-point data having the second form carried out in the input data converting section and the output data converting section. Accordingly, the circuit scale of the floating-point multiplying unit may be reduced.

According to the fourth aspect of the invention, zero and infinite are expressed only by the exponent part in the floating-point data having the second form. Accordingly, the circuit scale for handling zero and infinite may be reduced by the floating-point multiplying unit and the floating-point adding/subtracting unit.

According to the fifth aspect of the invention, the rounding process is omitted and the truncation process is carried out in finding the mantissa part in the floating-point multiplying unit and the floating-point adding/subtracting unit.

In case of the fifth aspect of the invention, the bit width of the mantissa part of the floating-point data having the second form is greater than the bit width of the mantissa part of the floating-point data having the first form, so that it is possible to reduce the influence of the rounding process to the bit width of the mantissa part required as the floating-point data having the first form. Therefore, it is possible to maintain the high precision even when the rounding process is omitted and the circuit scale of the floating-point multiplying unit and the floating-point adding/subtracting unit may be reduced because the rounding process may be omitted. Therefore, the arithmetic operation may be carried out at high speed.

According to the sixth and seventh aspects of the invention, the quick conversion and the highly accurate floating-point arithmetic operation may be executed by using the processors generally used by the conversion step between the floating-point data having the first form and the floating-point data having the second form.

According to the eighth and ninth aspects of the invention, the calculation of molecular orbits may be executed at high precision with the same degree of speed of the past.

BRIEF DESCRIPTION OF THE DRAWINGS

Preferred embodiments of the present invention will be described in detail based on the following figures, wherein:

FIG. 3A shows an example of a floating-point data format having a first form and FIG. 3B shows an example of a floating-point data format having a second form used in the embodiment;

FIG. 4 is a block diagram showing an example of the internal structure of a multiplier circuit within a arithmetic operation of sum of products circuit of the processor element of the embodiment;

FIG. 6 shows a floating-point data format having the second form used in another embodiment of the invention; and FIG. 7 explains a rounding error occurring in the calculation of an error function.

DESCRIPTION OF THE PREFERRED EMBODIMENT

An embodiment of the inventive parallel computer and parallel computing method will be explained below with reference to the drawings.

Figure 1:
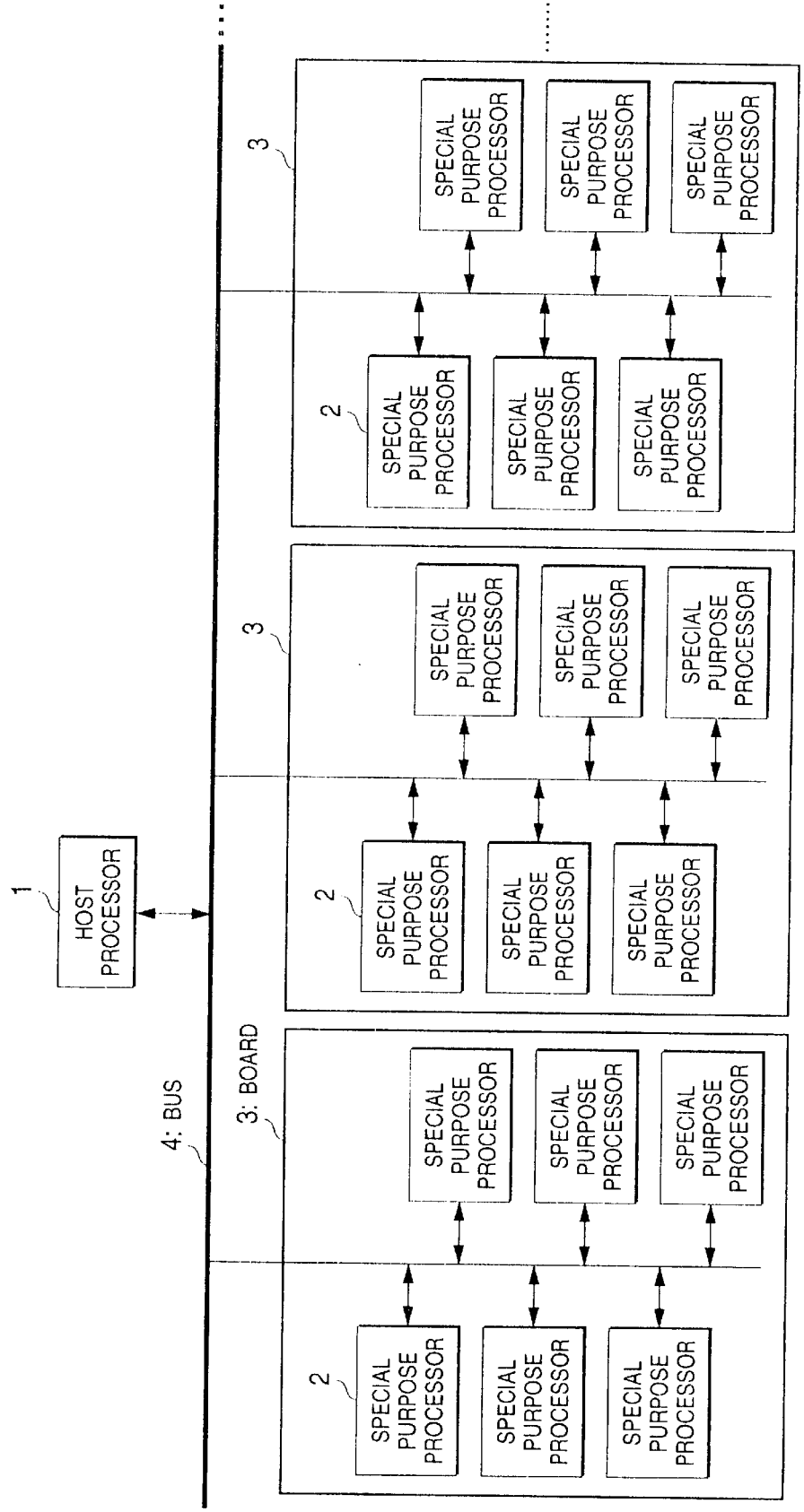
FIG. 1 is a block diagram showing an embodiment of a parallel computer according to the invention.

FIG. 1 is a block diagram showing the system structure of the parallel computer of the embodiment. In the figure, a host processor 1 may be configured by an existing personal computer or workstation. A plurality of special purpose processors 2 as an example of the processor element are prepared in the system. The plurality of special purpose processors 2 are collected per predetermined number and the unit of the collection is structured as a board 3. The host processor 1 and the plurality of boards 3 are connected by a bus 4.

Although a bus which is different from a bus coming out of the host via a bus bridge for converting bus protocols may be used here, the same one is used for the bus coming out of the host processor 1 and for the bus on the board 3 for the purpose of simplification in this case. Accordingly, the bus 4 connects the host processor 1 with the plurality of special purpose processors in this case.

The system shown in FIG. 1 carries out the calculation of molecular orbit by approximately the same method with the system described in the above-mentioned second document. The procedure for executing the calculation of molecular orbit will be shown below at first.

Procedure 1

The plurality of special purpose processors 2 share the enormous amount of calculation of two-electron integrals which is required in the calculation of molecular orbit. To that end, the host processor 1 transmits initial parameters such as the center coordinates of atoms A, B, C and D, an orbit exponent $\zeta$, the density matrix Ptu obtained from the above-mentioned equation (3) from the value of the coefficient C required for the calculation in each special purpose processor 2 via the bus 4 to each special purpose processor 2. Each special purpose processor 2 stores those received initial parameters in a built-in memory.

Procedure 2

Next, each special purpose processor 2 executes the calculations of error function Fm(T), of two-electron integrals expressed by the above-mentioned equations (9) and (10), and of grs composing the Fock matrix element expressed by the above-mentioned equation (2) by using the values of the density matrix by using the values of the initial parameters stored in the memory and by using a built-in sum of products operating circuit. Then, each special purpose processor 2 sends back the obtained value of grs to the host processor 1 via the bus 4.

Procedure 3

The host processor 1 calculates hrs contained in the above-mentioned equation (2) and calculates the Fock matrix element Frs together with the value of grs sent back from each special purpose processor 2. The host processor 1 also solves the problem of the characteristic value in the equation (1) to find a new coefficient C based on the value of the found Fock matrix element Frs.

The SCF method may be realized by repeating the above-mentioned procedures 1 through 3. The host processor 1 compares the value of the found coefficient C with the value of the coefficient found in the repetition just before SCF and ends the repetition of SCF when its difference is fully small. A value of energy of a molecule may be found by repeating the calculations in accordance to the abovementioned procedure by using this system.

Here, the floating-point data having the first form handled by the host processor 1 is determined to be double precision floating-point data defined by the IEEE standard 795 (hereinafter referred to simply as double precision) in the present embodiment. That is, the arithmetic operation of the floating-point executed by the host processor 1 is carried out all in the double precision in the present embodiment. The initial parameters are also represented by double precision. This precision satisfies the precision of the arithmetic operation of the characteristic value executed by the host processor 1 as described before. The input error of the initial parameters required for the precision of the error function described above is also satisfactory.

Figure 2:
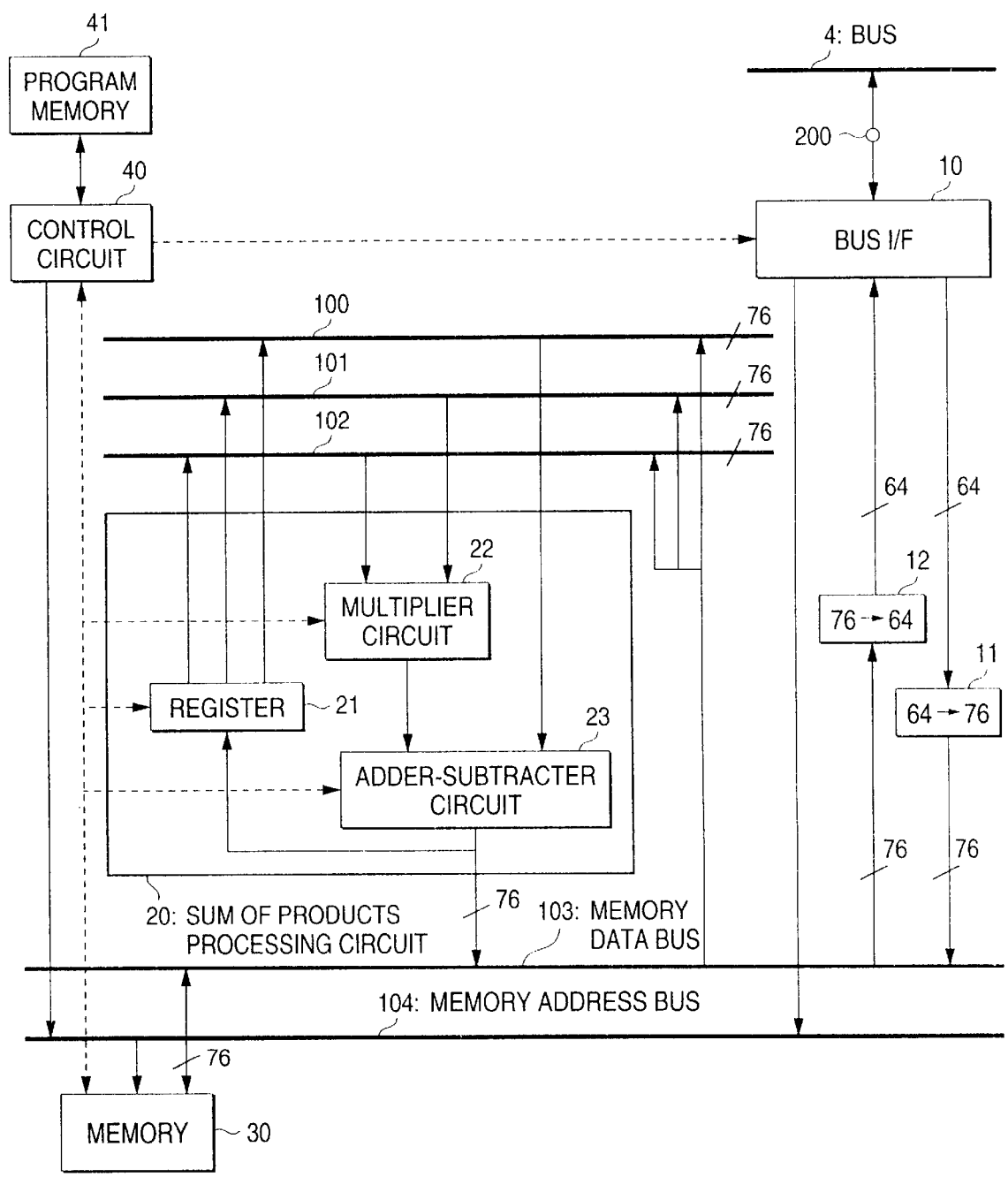
FIG. 2 is a block diagram showing the internal structure of a processor element according to the embodiment.

Next, the structure of the special purpose processor 2 will be explained. FIG. 2 is a block diagram showing the internal structure of the special purpose processor 2 used in the present embodiment. The special purpose processor 2 handles floating-point data having the second form in which the bit width of a mantissa part is larger than that of the double precision floating-point data having the first form as described later.

As shown in FIG. 2, the special purpose processor 2 comprises a bus interface circuit 10, an input data converting circuit 11, an output data converting circuit 12, a sum of products operating circuit 20, a memory 30, a control circuit 40 and a program memory 41. It also comprises internal buses 100, 101 and 102, a memory data bus 103 and a memory address bus 104.

The bus interface circuit 10 interfaces the bus 4 with the special purpose processor 2. The input data converting circuit 11 converts the floating-point data having the first form inputted from the bus 4 into the floating-point data having the second form. The output data converting circuit 12 converts the floating-point data having the second form into the double precision floating-point data having the first form to output a result of arithmetic operation to the bus 4.

The sum of products operating circuit 20 is a circuit for executing arithmetic operation of sum of products on the floating-point data having the second form and comprises a register 21 for storing the floating-point data having the second form, a multiplier circuit 22 for executing the multiplication of the floating-point and an adding/subtracting circuit 23 for executing addition/subtraction of the floating-point.

The memory 30 stores the floating-point data having the second form before and after the arithmetic operation. The control circuit 40 controls the inside of the special purpose processor 2. A program memory 41 holds programs executed by the control circuit 40.

The internal buses 100 through 102 transmit data to be inputted to the sum of products operating circuit 20. The memory data bus 103 transmits data inputted/outputted to/from the memory 30. The memory address bus 104 transmits addresses of the memory 30. It is noted that the reference numeral (200) denotes an input/output terminal for inputting/outputting from/to the bus 4.

Next, the function of the special purpose processor 2 constructed as described above will be explained. At first, the data input/output function of the host processor 1 and the special purpose processor 2 will be described.

The special purpose processor 2 inputs/outputs the double precision floating-point data having the first form to/from the host processor 1. Meanwhile, because the special purpose processor 2 is required to execute the arithmetic operation in the floating-point format having the second form whose precision is higher than the double precision as described above, it calculates by using own format of 76 bits which is greater than the double precision of 64 bits (hereinafter referred to as an internal format). The internal format will be described in detail later.

Accordingly, when data is to be inputted from the host processor 1 to the special purpose processor 2, the double precision floating-point data is structured from signals inputted under the transmission procedures of the bus 4 in the bus interface circuit 10, the output data converting circuit 12 converts the double precision floating-point data into data having the internal format of 76 bits and outputs the converted data to the memory 30 via the memory data bus 103.

In the same time, the bus interface circuit 10 generates an address of the memory 30 specified from the bus 4 and supplies it to the memory 30 via the memory address bus 104. After that, the control circuit 40 writes the 76 bit data to the memory 30 by supplying adequate control signals to the memory 30.

When data is to be outputted from the special purpose processor 2 to the host processor 1, the bus interface circuit 10 generates an address of the memory 30 specified from the bus 4 and supplies it to the memory 30. Then, the data represented by the 76 bit internal format is read out via the memory data bus 103. After that, the input data converting circuit 11 converts this data into the double precision floating-point data, the bus interface circuit 10 generates a signal inputted by the transmission procedure of the bus 4 to output the data to the bus 4.

Next, the function of the sum of products operating circuit 20 will be explained.

Under the control of the control circuit 40, the sum of products operating circuit 20 executes the arithmetic operation of sum of products by using the floating-point data represented by the 76 bit internal format stored in the memory 30 and the register 21 and stores its result in the memory 30 and the register 21. At this time, a arithmetic operation of sum of products program is stored in the program memory 41 in advance and the control circuit 40 reads the arithmetic operation of sum of products program sequentially to generate corresponding control signals to control the sum of products operating circuit 20 and the memory 30.

The function of each part of the sum of products operating circuit 20 will be explained below in detail.

The floating-point data represented by the internal format of 76 bits is supplied from the register 21 or the memory 30 to the multiplier circuit 22 and the adder/subtracter circuit 23 within the sum of products operating circuit 20 via the memory data bus 103 and through the internal buses 100 through 102.

The register 21 has three read ports, so that the data is read independently from each port to the internal buses 100 through 102 at this time. The data read also from the memory 30 is inputted either one of the internal buses 100 through 102 via the memory data bus 103.

The control circuit 40 generates the addresses and control signals to be sent to the register 21 and the memory 30 in reading in accordance to the arithmetic operation of sum of products program in the program memory 41.

The multiplier circuit 22 and the adder/subtracter circuit 23 within the sum of products operating circuit 20 execute the arithmetic operation of sum of products by using the data supplied via the internal buses 100 through 102 and outputs the result of operation. As shown in FIG. 2, the multiplier circuit 22 inputs the data from the internal buses 101 and 102 and the adder/subtracter circuit 23 inputs the result of the multiplier circuit 22 and the data from the internal bus 100. This configuration allows the arithmetic operation of sum of products to be realized and the output of the adder/subtracter circuit 23 to be outputted as the result of arithmetic operation of sum of products.

The control circuit 40 generates the control signals of the multiplier circuit 22 and the adder/subtracter circuit 23 in accordance to the arithmetic operation of sum of products program to supply to the sum of products operating circuit 20 and to control the operating timing of the sum of products operating circuit 20.

The multiplier circuit 22 and the adder/subtracter circuit 23 have a function of bypassing the input to the output as it is. This function is controlled by a control signal from the control circuit 40. The multiplication is realized by bypassing the input from the multiplier circuit 22 to the output and the addition and subtraction are realized by bypassing one input of the multiplier circuit 22 to the output by the adder/subtracter circuit 23. What operates in pipeline is used in this example as the suitable structure of the sum of products operating circuit 20.

The result of operation obtained by the sum of products operating circuit 20 is outputted from the adder/subtracter circuit 23 and is written to the register 21 or the memory 30. The result of the arithmetic operation of sum of products is supplied to the memory 30 via the memory data bus 103. The addresses and the control signals sent to the register 21 and the memory 30 at this time are generated and supplied by the control circuit 40 based on the arithmetic operation of sum of products program similarly to the case of reading.

Because the special purpose processor 2 operates as described above, it can calculate the two-electron integral and grs in the equation (2). Then, procedures of the special purpose processor 2 in calculating grs in the equation (2) by receiving the initial parameters from the host processor 1 by using the functions described above will be explained.

At first, the special purpose processor 2 receives the orbit exponent $\zeta$, the coordinates A, B, C and D, the density matrix Ptu, the coefficients in the Taylor expansion shown in the equation (42) and the like from the host processor 1 in the form of the double precision floating-point data, converts it in the internal format of 76 bits by the input data converting circuit 11 and then stores in the memory 30.

Next, the special purpose processor 2 calculates the value of the error function Fm(T), (s*s*, s*s*) (m), the value of two-electron integral and the value of grs one after another in accordance to the above-mentioned equations (1) through (28) by using the sum of products operating circuit 20 while reading the initial parameters stored in the memory 30 in accordance to the calculation procedure of the arithmetic operation of sum of products program stored in the program memory 41 and writes the value of the obtained grs to the memory 30. The arithmetic operations of this time are all carried out by using the internal format of 76 bits.

The intermediate result appearing on the way of the calculation is stored in the register 21 and the memory 30 to be used. Further, an inverse number of (½) power appearing in the equation (25) is calculated by the Newton method and the calculation of exp appearing in the equation (27) is calculated by the Taylor expansion by the repetition of the arithmetic operation of sum of products similarly to the calculation of the inverse number and of the error function described above. Accordingly, all of the calculation may be carried out by using the sum of products operating circuit 20.

In the end, the value of grs of the internal format stored in the memory 30 as described above is converted into the double precision floating-point data by the output data converting circuit 12 and is outputted to the bus 4 by the bus interface circuit 10 to be sent to the host processor 1. The calculation of molecular orbit using the above-mentioned system of the embodiment may be realized by the calculation procedures as described above.

Next, the internal format of the floating-point of 76 bits used in the present embodiment will be explained. FIG. 3A shows the format of the double precision floating-point defined by the IEEE Standard 754 and FIG. 3B shows the internal format of the special purpose processor 2 used in the present embodiment.

The format of the double precision floating-point defined by the IEEE Standard 754 will be explained at first. The format shown in FIG. 3A is composed of a sign part s of 1 bit, an exponent part e of 11 bits and a mantissa part f0 of 52 bits. A real number v represented by this format may be calculated based on the equations shown in FIG. 3A.

That is, the real number v other than 0 is normalized in representing by the floating-point in the format of the double precision floating-point as follows:

$$v=(-1)^{sign} \times_2 \exp \times (1, xxx \ldots) \qquad (48)$$

Then, sign is stored in the sign part s, the higher order 52 bits among the part xxx . . . below the decimal point of the part on the most right side represented by binary number (1.xxx . . . ) is stored in the mantissa part f0 and the exponent exp for the normalization in the exponent part e, respectively.

However, because the value of exp may be minus, it is stored in the exponent part e by adding an offset of 1023 in advance. Thereby, the value of the exponent part e is set as 1 to 2046 and the value of exp may be specified in the range of −1022 to +1023.

When the value of exponent part e is zero, it represents a special number and the mantissa part f0 is zero at that time, the real number v=0. When the mantissa part f0 at that time is not zero, the real number v is considered to represent a number whose absolute number is so small that the normalization shown in the equation (48) cannot be implemented (called unnormalized number).

When the value of the exponent part e is 2047, it also represents a special number. When the mantissa part f0 at that time is zero, the real number v=±∞ and when the mantissa part f0 at that time is not zero, the real number v is considered to represent an undefined number like a result of calculation of 0×∞.

Next, the floating-point representation in the internal format of the special purpose processor 2 of the present embodiment will be explained.

As shown in FIG. 3B, the floating-point data of this internal format is composed of a sign part s of 1 bit, an exponent part e of 11 bits and a mantissa part f1 of 64 bits. The sign part s of 1 bit and the exponent part e of 11bits have the same structure with the sign part s and the exponent part e of the above-mentioned double precision floating-point format. However, the mantissa part f1 is set at 64 bits to have the high precision floating-point format higher than the double precision floating-point format.

The value having the same meaning with the double precision representation is stored in the exponent part e of the internal format except of the cases of e=0 and e=2047. Further, the mantissa part f1 stores the higher order 64 bits of the part xxx . . . among 1. xxx . . . when the real number v is normalized as shown in the above-mentioned equation (48).

Differing from the double-precision floating-point, this internal format has no representation to the unnormalized number and the undefined number. Accordingly, regardless whether the value of the mantissa part f1 is 0 or not, it represents the real number V=0 when the exponent part e=0 and the real number v=±∞ when the exponent part e=2047.

When the mantissa part of 64 bits is given like this internal format, the precision turns out to be 65 bits including 1 at the higher order of the decimal point, so that the precision of the mantissa part of 62 bits which is required for the calculation of the error function is satisfied as described above. Although the precision of the mantissa part will do if it is just 62 bits, the precision of the mantissa part is 64 bits by giving a margin of 3 bits in the present embodiment because there is a case when the circuit can be readily structured when the length of the mantissa part is set at a number of second power.

Next, the background in deciding the internal format of the special purpose processor 2 of the present embodiment will be described.

Differing from the conventional quadruple-precision format, the length of the exponent part e of the internal format of the special purpose processor 2 of the present embodiment is the same with the double-precision format in the IEEE Standard 754 even though the mantissa part is 64 bits.

Because a processor of a special purpose computer which operates in accordance to a specific algorithm like the present embodiment implements calculations in a specific procedure by inputting values in a range defined by a certain degree, a range of the result which may take on the way of calculation is limited. Therefore, it is possible to represent the exponent part of the internal representation by 11 bits similarly to the double-precision floating-point representation by devising the algorithm. Thereby, it is possible to shorten the floating-point data having the second form as the internal format, to reduce a memory capacity for storing this data and to reduce the scale of the circuit for calculating the exponent because the value of the abovementioned offset may be set at 1023 in the same manner.

When the internal format is used, it is considered that no ∞ nor undefined is sent to the special purpose processor 2 even when ∞ and undefined happen to be mixed in the initial parameters sent from the host processor 1 to the special purpose processor 2 because a countermeasure may be taken by the host processor 1 by issuing an error to nullifying the calculation itself.

When the unnormalized number happens to appear in the initial parameter, it may be caused to be non-unnormalized number by multiplying a constant to the value by the host processor 1 in advance. Or, when it may be considered to be 0 by the special purpose processor 2, it may be sent not as the unnormalized number but as a value of 0.

Further, when the result on the way of the calculation by the special purpose processor 2 turns out to be a so small number or a so large number that it cannot be represented by the exponent part e of 11 bits, there is a case when a calculation of $0 \times \infty$ occurs in the multiplier, though it is very rare. In such a case, it may be detected by judging the exponent part e of the calculation result by the sum or products operating circuit 20 is 0 or 2047.

Accordingly, when the special purpose processor 2 detects such a case by judging whether the exponent part e is 0 or 2047, it can inform of that by causing an interrupt from the special purpose processor 2 to the host processor 1 or by raising a specific flag without sending the unnormalized number or undefined to the host processor 1. Receiving this notice, the host processor 1 can treat it adequately by causing an error or by zeroing the calculation result.

As described above, the internal format of 76 bits of the present embodiment has no representation to the unnormalized number and undefined and causes no trouble by assuming a very small number as 0 and a very large number and undefined number as $\infty$.

Thus, the IEEE Standard 754 represents 0 and the unnormalized number or $\infty$ and undefined number by both of the exponent part e and the mantissa part f0, the internal format of the special purpose processor 2 of the present embodiment requires no such representation for the unnormalized number and undefined number and as a result, the internal format represents 0 and $\infty$ regardless of the value of the mantissa part f1 when the value of the exponent part e is 0 or 2047. Accordingly, circuits for implementing unexceptional processes within the multiplier circuit 22 and the adder/subtracter circuit 23 in the sum or products operating circuit 20 are simplified.

Next, the method of multiplication and addition/subtraction using the 76 bit internal format in the present embodiment will be explained.

At first, the structure and operation of the multiplier circuit 22 will be explained with reference to FIG. 4. As shown in the block diagram of FIG. 4, the multiplier circuit 22 used in the present embodiment comprises a multiplication core circuit 300, all-0 judging circuits 301 and 302, all-1 judging circuits 303 and 304, OR gates 310, 311 and 312 and multiplexers 313, 314 and 315.

The multiplication core circuit 300 multiplies floating-point data of inputs A and B represented by the internal format of 76 bits.

Receiving the exponent part of 11 bits of the inputs A and B represented by the internal format of 76 bits as inputs, the all-0 judging circuits 301 and 302 output "1" only when the values of them are all 0. Receiving the exponent part of 11 bits of the inputs A and B as inputs, the all-1 judging circuits 303 and 304 outputs "1" only when the values of them are all 1.

The OR gate 310 takes a logical sum of the underflow output uf of the multiplication core circuit 300 and the output of the all-0 judging circuits 301 and 302. The OR gate 311 takes a logical sum of the overflow output of of the multiplication core circuit 300 and the output of the all-1 judging circuits 303 and 304. The OR gate 312 takes a logical sum of the OR gate 310 and 311.

Receiving the output of the OR gate 310 and 311 as a selection control signal SE1 of 2 bits, the multiplexer 313 selects one among three exponent part data of 11bits of all 0, all 1 and the exponent part data in the multiplication output M1 of the multiplication core circuit 300.

Receiving the output of the OR gate 312 as a selection control signal SE2, the multiplexer 314 selects one out of two mantissa parts of 64 bits of all 0 and the mantissa part data in the multiplication output M1 of the multiplication core circuit 300.

The multiplexer 315 selects floating-point data represented by the internal format of 76 bits which turns out to be an output MO of the multiplier circuit 22 from two types of data. One of the two types of data to be selected is the input A in bypassing the multiplier circuit 22. The other one is a final multiplication result M2 represented by the internal format of 76 bits composed of the sign part in the multiplication output M1 of the multiplication core circuit 300, the exponent part selected by the multiplexer 313 and the mantissa part selected by the multiplexer 314.

The multiplexer 315 selects whether it outputs the final result of multiplication M2 or the bypass input data A as the output MO by the selection control signal inputted from the control circuit 40.

Next, the operation of the multiplier circuit 22 constructed as described above will be explained.

The two inputs A and B represented by the internal format are multiplied by the multiplication core circuit 300 and the result of multiplication M1 represented by the internal format is outputted from the multiplication core circuit 300.

At this time, the result of multiplication of the mantissa parts of the two inputs A and B is rounded to obtain the mantissa part of the result of multiplication M1 in the multiplication core circuit 300. This rounding allows the operating accuracy of 65 bits to be obtained. It will do if the exponent part and the mantissa part of the result of multiplication M1 in the internal format outputted from the multiplication core circuit 300 are correct only when the field of the exponent part e of the input and output of the multiplication core circuit 300 falls within the range of 1 to 2046.

Here, such multiplication core circuit maybe constructed just by expanding the bit width of the mantissa part by using a known multiplication circuit used for the double-precision floating-point because the internal format is what the bit width of the mantissa part of the double-precision floating-point has been just expanded as shown FIG. 3. Accordingly, the detail of the internal structure of the multiplication core circuit 300 in the present embodiment will be omitted here.

When the output of multiplication becomes so small that it cannot be expressed by the internal format (underflow) because the exponent part exceeds the range of 11 bits even though the inputs A and B are represented by the internal format like a multiplication of $(1 \times 2^{-1000})$, the multiplication core circuit 300 outputs "1" from the underflow output uf.

When the output of multiplication becomes so large that it cannot be expressed by the internal format (overflow) because the exponent part exceeds the range of 11 bits even though the inputs A and B are represented by the internal format like a multiplication of $(1 \times 2^{-1000})$, the multiplication core circuit 300 outputs "1" from the overflow output of.

Further, because the exponent parts of the inputs A and B of the internal format are inputted to the all-0 judging circuits 301 and 302 and the all-1 judging circuits 303 and 304, the all-0 judging circuit 301 outputs "1" when the input A is zero and the all-0 judging circuit 302 outputs "1" when the input B is zero. The all-1 judging circuit 303 also outputs "1" when the input A is ∞ and the all-1 judging circuit 304 outputs "1" when the input B is ∞.

Next, a method for generating the final result of multiplication M2 of the internal format from the result of multiplication M1 of the internal format generated by the multiplication core circuit 300 will be explained.

At first, the sign part of the result of multiplication M1 turns out to be the sign part of the final result of multiplication M2 as it is.

Next, the exponent part of the final result of multiplication M2 is outputted by the multiplexer 313. Because the underflow output uf of the multiplication core circuit 300 and the result of judgment of the all-0 judging circuits 301 and 302 are inputted to the OR gate 310 at this time, the output of the OR gate 310 becomes "1" when the multiplication underflows or the input A or the input B is zero. Further, because the overflow output of of the multiplication core circuit 300 and the result of judgment of the all-1 judging circuits 303 and 304 are inputted to the OR gate 311, the output becomes "1" when the multiplication overflows or the input A or the input B is ∞.

These outputs of the OR gates 310 and 311 are put together as the selection control signal SE1 of 2 bits and is inputted to the multiplexer 313. Then, the multiplexer 313 outputs the exponent part of the result of multiplication M1 when the selection control signal SE1 is "00", outputs 0 of 11 bits (all 0) when it is "10" and outputs 1 of 11 bits (all 1) in case other than those.

Further, as for the mantissa part of the final result of multiplication M2, the multiplexer 314 outputs the mantissa part of the result of multiplication M1 when the selection control signal SE2 from the OR gate 312 is "0" corresponding to the signal SE2 and 0 of 64 bits (all 0) when the signal SE2 is "1". Because the OR gate 312 outputs the output of the logical sum of the OR gates 310 and 311 as the selection control signal SE2, the selection control signal SE2 becomes "1" and 0 of 64 bits is outputted from the multiplexer 314 as the mantissa part of the final result of multiplication M2 when the result of multiplication overflows or underflows or when either 0 or ∞ exists in the inputs A and B. The mantissa part of the result of multiplication M1 is outputted in other cases.

As a result, when the result of multiplication M1 does not overflow nor underflow or when both inputs A and B are not 0 nor ∞, the selection control signal SE1 is "00" and the selection control signal SE2 is "0", so that the result of multiplication M1 is outputted as it is at the final result of multiplication M2.

When the result of multiplication underflows or when the input A or B is 0 and neither one of the inputs A and B are ∞, the selection control signal SE1 is "10" and the selection control signal SE2 is "1", so that the exponent part of the final result of multiplication M2 becomes 0 and becomes 0 of the internal format. It is noted that because the mantissa part of the final result of multiplication M2 becomes also 0 by the multiplexer 314, it represents 0 even when the double-precision floating-point of the IEEE Standard 754 is taken out by extracting the higher order 52 bits from the mantissa part of 64 bits of the internal format as described later.

Further, when the result of multiplication overflows or when the input A or B is ∞ and neither one of the inputs A and B are 0, the selection control signal SE1 is "01" and the selection control signal SE2 is "1", so that the exponent part of the final result of multiplication M2 becomes 2047 and becomes ∞ of the internal format. It is noted that because the mantissa part of the final result of multiplication M2 becomes also 0 by the multiplexer 314, it represents ∞ even when the double-precision floating-point of the IEEE Standard 754 is taken out by extracting the higher order 52 bits from the mantissa part of 64 bits of the internal format as described later.

Still more, when one of the input A and the input B is 0 and the other one is ∞, the selection control signal SE1 is "11 and the selection control signal SE2 is "1", so that the final result of multiplication M2 turns out to be the same output with the above-mentioned case of outputting ∞. In this case, the IEEE Standard 754 takes the representation expressing ∞ where the result should be set at undefined. However, because ∞ and undefined need not be distinguished in the system of the present embodiment, it may be outputted as it is.

Finally, the final result of multiplication M2 is outputted as one output MO selected among the bypass data of the input A by the multiplexer 315. Here, the bypass route of the input A is provided for bypassing like the case of executing the addition/subtraction command as described before.

It is noted that the selection control signal SE1 described above is outputted also as a flag signal FLAG1 and is inputted to the control circuit 40 via a path of a broken line shown in FIG. 2. The control circuit 40 detects that the result of multiplication is 0 or ∞ by interruption by this flag signal FLAG 1 and can execute an adequate processing program corresponding to that.

As described above, because the multiplier circuit has the structure in which the known double-precision floating-point multiplier circuit is expanded only by a number of bits which satisfies the approximately required precision, the increase of the circuit scale may be minimized and the calculation of the required precision may be executed at high speed.

Figure 5:
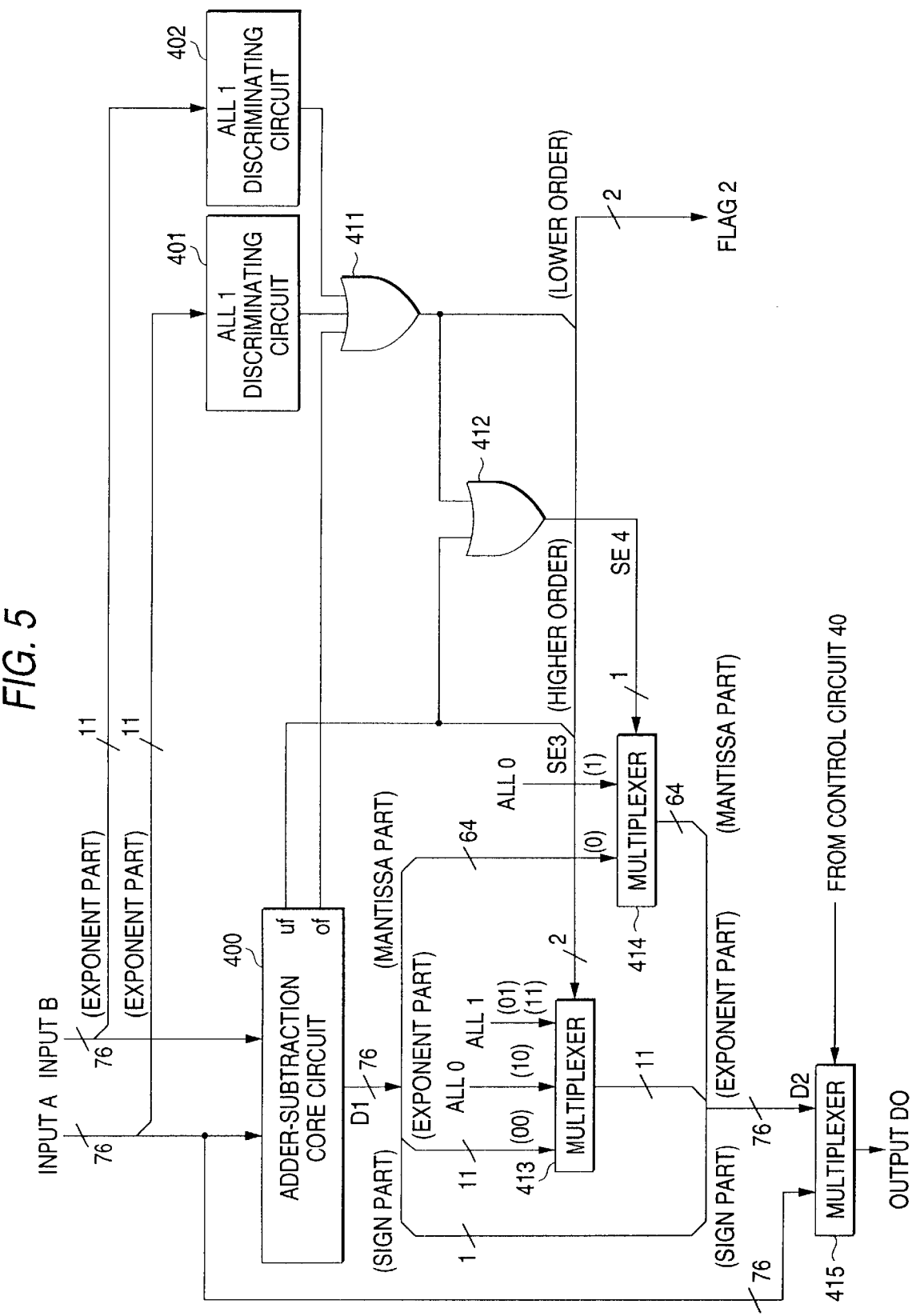
FIG. 5 is a block diagram showing an example of the internal structure of an adder/subtracter circuit within the arithmetic operation of sum of products circuit of the processor element of the embodiment.

Next, the structure and operation of the adder/subtracter circuit 23 will be explained with reference to FIG. 5. As shown in the block diagram of FIG. 5, the adder/subtracter circuit 23 used in the present embodiment comprises a addition/subtraction core circuit 400, all-1 judging circuits 401 and 402, OR gates 411 and 412 and multiplexers 413, 414 and 415.

The addition/subtraction core circuit 400 adds/subtracts floating-point data of inputs A and B represented by the internal format of 76 bits. Receiving the exponent part of 11 bits of the inputs A and B represented by the internal format of 76 bits as inputs, the all-1 judging circuits 401 and 402 output "1" only when the values of them are all 1.

The OR gate 411 takes a logical sum of the overflow output of of the addition/subtraction core circuit 400 and the output of the all-1 judging circuits 401 and 402. The OR gate 412 takes a logical sum of the underflow output uf of the addition/subtraction core circuit 400 and the output of the OR gate 411.

Receiving 2 bits of the underflow output uf of the addition/subtraction core circuit 400 and the output of the OR gate 411 as a selection control signal SE3, the multiplexer 413 selects one among three exponent part data of 11 bits of all 0, all 1 and the exponent part data in the addition/subtraction output D1 of the addition/subtraction core circuit 400.

Receiving the output of the OR gate 412 as a selection control signal SE4, the multiplexer 414 selects one out of two mantissa parts of 64 bits of all 0 and the mantissa part data in the addition/subtraction output D1 of the addition/subtraction core circuit 400.

The multiplexer 415 selects floating-point data represented by the internal format of 76 bits which turns out to be an output DO of the adder/subtracter circuit 23 from two types of data. One of the two types of data to be selected is the input A in bypassing the adder/subtracter circuit 23. The other one is a final addition/subtraction result D2 represented by the internal format of 76 bits composed of the sign part in the addition/subtraction output D1 of the addition/subtraction core circuit 400, the exponent part selected by the multiplexer 413 and the mantissa part selected by the multiplexer 414.

The multiplexer 415 selects whether it outputs the final result of addition/subtraction D2 or the bypass input data A as the output DO by the selection control signal inputted from the control circuit 40.

Next, the operation of the adder/subtracter circuit 23 constructed as described above will be explained.

The two inputs A and B represented by the internal format are added/subtracted by the addition/subtraction core circuit 400 and the result of addition/subtraction D1 represented by the internal format is outputted from the addition/subtraction core circuit 400.

At this time, the result of addition/subtraction of the mantissa parts of the two inputs A and B is rounded to obtain the mantissa part of the result of addition/subtraction D1 in the addition/subtraction core circuit 400. This rounding allows the operating accuracy of 65 bits to be obtained. It will do if the exponent part and the mantissa part of the result of addition/subtraction D1 in the internal format outputted from the addition/subtraction core circuit 400 are correct only when the field of the exponent part e of the output of the addition/subtraction core circuit 400 falls within the range of 1 to 2046.

Here, such addition/subtraction core circuit 400 may be constructed just by expanding the bit width of the mantissa part by using a known addition/subtraction circuit used for the double-precision floating-point because the internal format is what the bit width of the mantissa part of the double-precision floating-point as shown FIG. 3. Accordingly, the detail of the internal structure of the addition/subtraction core circuit 400 in the present embodiment will be omitted here.

Here, the adder/substracter circuit 23 is Differing from the multiplier circuit 22, the output is a value within the range represented by the internal format even when the other one of the input is 0 as long as the other one has a value in an adequate range, so that no exceptional process corresponding to the case when the input is 0 like the multiplier circuit 22.

When the result of calculation becomes so small that it cannot be expressed by the value of the exponent part e of greater 1 in the internal representation like addition between 0 and a calculation of $(1 \times 2^{+2})-(1 \times 2^{+2})$, the addition/subtraction core circuit 400 outputs "1" from the underflow output uf by considering that underflow has occurred.

When the output becomes so large that it cannot be expressed by the internal format (overflow) because the exponent part exceeds the range of 11 bits even though the inputs A and B are represented by the internal format like a addition of $(1.1 \times 2^{+1023})$, the addition/subtraction core circuit 400 outputs "1" from the overflow output of.

Further, the exponent part of the input A is inputted to the all-1 judging circuit 401 and the exponent part of the input B is inputted to the all-1 judging circuit 402, so that the control circuit 401 and the control circuit 402 output "1" when the inputs A and B are $\infty$.

Next, a method for generating the final result of addition/subtraction D2 from the result of addition/subtraction D1 outputted from the addition/subtraction core circuit 400 will be explained.

At first, the sign part of the result of addition/subtraction D1 is outputted to the final result of addition/subtraction D2 as it is.

Next, the exponent part of the final result of addition/subtraction D2 is selected by the multiplexer 413. Because the overflow output of of the addition/subtraction core circuit 400 and the result of judgment of the all-1 judging circuits 401 and 402 are inputted to the OR gate 411 for selecting the selection control signal SE3 of the multiplexer 413, the output of the OR gate 411 becomes "1" when the addition/subtraction overflows or the input A or the input B is $\infty$. The output of the OR gate 411 is turned to the selection control signal SE3 of 2 bits together with the underflow output uf of the addition/subtraction core circuit 400 to control the multiplexer 413. When the selection control signal SE3 of 2 bits is "00", the multiplexer 413 outputs the exponent part of the result of addition/subtraction D1 and when it is "10", outputs 0 (all 0) of 11 bits or when it is "01" or "11", outputs 1 (all 1) of 11 bits.

Further, the multiplexer 414 outputs the mantissa part of the final result of addition/subtraction D2. Because the OR gate 412 which outputs the selection control signal SE4 of the multiplexer 414 takes a logical sum of the underflow output uf of the addition/subtraction core circuit 400 and the OR gate 411, the selection control signal SE4, i.e., the its output, becomes "1" when the result of addition/subtraction D1 overflows or underflows or even when one of 0 or $\infty$ exists in the inputs A and B.

Then, when the selection control signal SE4 is "1", the multiplexer 414 outputs 0 (all 0) of 64 bits and when "0", outputs the mantissa part of the result of addition/subtraction D1, respectively.

As a result, when the result of addition/subtraction D1 does not overflow nor underflow or when both inputs A and B are not $\infty$, the selection control signal SE3 is "00" and the selection control signal SE4 is "0", so that the result of addition/subtraction D1 is outputted as it is to the final result of addition/subtraction D2.

When the result of addition/subtraction D1 underflows, the selection control signal SE3 is "10", so that the exponent part of the final result of addition/subtraction D2 becomes all 0 and becomes 0 of the internal format. It is noted that because selection control signal SE4 becomes "1" and the mantissa part of the final result of addition/subtraction D2 becomes also 0, it represents 0 even when the double-precision floating-point of the IEEE Standard 754 is taken out by extracting the higher order 52 bits from the mantissa part of 64 bits of the internal format as described later.

Further, the selection control signal SE3 is "01" when the result of addition/subtraction D1 overflows or when either one of the input A or B is $\infty$, so that the exponent part of the final result of addition/subtraction D2 becomes 2047 and becomes $\infty$ of the internal format. It is noted that because the selection control signal SE4 becomes "1" and the mantissa part of the final result of addition/subtraction D2 becomes also 0, it represents $\infty$ under the IEEE Standard 754 even when the double-precision floating-point is taken out by extracting the higher order 52 bits from the mantissa part of 64 bits of the internal format as described later.

When calculation of $\infty-\infty$ is implemented, the value of the selection control signal SE3 becomes "01" or "11". When the mantissa parts of both inputs A and B are not equal, the underflow output of the addition/subtraction core circuit 400 is 0, so that the selection control signal SE3 is "01" similarly to the case described above.

Next, when the mantissa parts of both inputs A and B are equal in the calculation of $\infty-\infty$, the result of subtraction of the mantissa parts within the addition/subtraction core circuit 400 becomes just. 0, so that the underflow output becomes 1 and as a result, the selection control signal SE3 becomes "11". Because the multiplexer 413 outputs 1 (all 1) of 11 bits as the exponent part of the final result of addition/subtraction D2 also in this case, the final result of addition/subtraction D2 is a number representing ∞ under the IEEE Standard 754 because the mantissa part is 0 similarly to the case when the result of addition/subtraction D1 overflows. Although the result should be set originally as undefined, it may be outputted as it is because the system of the present embodiment does not require to distinguish ∞ from undefined.

Finally, the final result of addition/subtraction D2 is outputted as one output DO selected among the bypass data of the input A by the multiplexer 415. Here, the bypass route of the input A is provided for bypassing like the case of executing the multiplication command as described before.

It is noted that the selection control signal SE3 of 2 bits is outputted also as a flag signal FLAG2 and is inputted to the control circuit 40 via a path of a broken line shown in FIG. 2. The control circuit 40 detects that the result of addition/subtraction is 0 or ∞ by interruption by this flag signal FLAG2 and can execute an adequate processing program corresponding to that.

As described above, because the adder/subtracter circuit 23 described above has the structure in which the known double-precision floating-point adder/subtracter circuit is expanded only by a number of bits which satisfies the approximately required precision, the increase of the circuit scale may be minimized and the calculation of the required precision may be executed at high speed.

Next, the input data converting circuit 11 and the output data converting circuit 12 will be explained.

These circuits convert among the internal format shown in FIG. 3B and the format of the double-precision floating-point shown in FIG. 3A. The input data converting circuit 11 for converting numbers represented by the double-precision floating-point format into the internal format converts the format as follows:

(a) Outputs the sign part and the exponent part of the double-precision floating-point format as the sign part and the exponent part of the internal format as they are; and (b) Outputs the mantissa part of 52 bits of the double-precision format to the higher order 52 bits of the mantissa part of 64 bits of the internal format and outputs all 0 data to the lower order 12 bits of the mantissa part of the 64 bits of the internal format.

The output data converting circuit 12 converts the format as follows:

(c) Outputs the sign part and the exponent part of the internal format as the sign part and the exponent part of the double-precision format as they are; and (d) Outputs the mantissa part of 64 bits of the internal format to the mantissa part of the double-precision format by taking out 52 bits from its higher order.

Thus, the output data converting circuit 12 outputs the 53-rd bit of the mantissa part of the internal format without rounding as shown in (d). Then, the precision of the output data grs itself is 52 bits as compared to the case of 53 bits when rounded, the precision of the Fock matrix element Frs calculated by the equation (2) based on grs is considered to be enough with 52 bits.

As described above, according to the present embodiment, because adopting the format whose bit width of the mantissa part is different from that of the double-precision floating-point data and is increased more than the mantissa part of the double-precision floating-point as shown in FIG. 3 as the internal format in the special purpose processor 2 whose precision is higher than that of the double-precision floating-point, so that the high precision floating-point arithmetic operation may be realized by the special purpose processor 2 just by providing the simple converter circuits between the double-precision floating-point.

It is noted that although the operating accuracy of 65 bits has been assured because rounding process is carried out in the multiplication core circuit 300 and the addition/subtraction core circuit 400 in the embodiment described above, the mantissa part of the result of multiplication of the mantissa parts or of addition/subtraction of the mantissa parts may be formed the result of the mantissa parts just by truncating the lower order bits without implementing the rounding process.

When it is formed as described above, although the operating accuracy becomes 64 bits which is smaller by 1 bit as compared to the case of executing the rounding process, it satisfies 62 bits which is the operating accuracy required for the error function. Further, because such arrangement requires no rounding circuit, the circuit scale may be reduced and the speed of calculation may be increased.

Further, although the part of xxx . . . has been set as the mantissa part when the real number v is expressed as shown in the above-mentioned equation (48) in the example of the internal format shown in FIG. 3, the part 1xxx . . . of the equation (48) may be set at a mantissa part as shown in FIG. 6.

Thereby, although the operating accuracy is 63 bits which is smaller by 1 bit as compared to the above-mentioned case when no rounding process is carried out in the multiplication core circuit 300 and the addition/subtraction core circuit 400, it satisfies 62 bits which is the operating accuracy required for the error function. Further, although 1 had to be added to the highest order of the mantissa part in the circuit for multiplying the double-precision floating-point, the above-mentioned arrangement can simplify the circuit because the multiplication core circuit 300 can multiply the mantissa part as it is.

When the above-mentioned arrangement is taken, the input data converting circuit 11 converts the double-precision floating-point data into the floating-point data of the internal format of the special purpose processor 2 by:

(e) converting the sign part of the double-precision floating-point data into the sign part of the floating-point data of the internal format;

(f) converting the exponent part of the double-precision floating-point data into the exponent part of the floating-point data of the internal format; and (g) converting the highest order 1 bit in the mantissa part of the floating-point data of the internal format into 1, 52 bits which are lower than the highest order into the mantissa part of the double-precision floating-point data and bits lower than that into 0 data.

Accordingly, because 1 is contained in the highest order in the mantissa part of the floating-point data of the internal format in this case, it becomes unnecessary to add 1 to the highest order of the mantissa part and the multiplication core circuit 300 can multiply the mantissa part as it is in carrying out the multiplication, thus simplifying the circuit.

Then, in this case, the output data converting circuit 12 converts the floating-point data of the internal format of the special purpose processor 2 into the double-precision floating-point data by:

(h) converting the sign part of the floating-point data of the internal format into the sign part of the double-precision floating-point data;

(i) converting the exponent part of the floating-point data of the internal format into the exponent part of the double-precision floating-point data; and (j) converting 52 bits from the second higher order bit of the mantissa part of the floating-point data of the internal format into the mantissa part of 52 bits of the double-precision floating-point data.

It is noted that although the cases of implementing the conversions between the double-precision floating-point and the internal format and the arithmetic operation of floating-point-in the internal format by hardware by preparing the special purpose processors as the processor elements in the explanation of the embodiment, it is possible to implement the conversions between the formats and the calculation in the internal format by software by using processor element which is provided with the conventional function for operating double-precision floating-point.

Although the converting and operating speed drops in this case as compared to the case of providing the special purpose processor, it is fast because the conversion may be implemented simply as compared to the case of using quadruple-precision and the present invention is effective also in such a case.

Further, although the calculation of molecular orbit has been exemplified in the above explanation, it is needless to say that the present invention is applicable to any types of parallel computer which implements calculations other than the calculation of molecular orbit and in which a host processor and a plurality of processor elements share the calculation by the floating-point.

Because calculation requiring a large number of times of arithmetic operation is assigned to the special purpose processor in general when there are a plurality of special purpose processors, high precision is required for the calculation in the special purpose processor. Accordingly, the present invention is effective also to such parallel computer.

As described above, the invention allows the parallel calculation at high precision without requiring a hardware scale which may exceed the specification and while maintaining the high speed. In particular, it can suppress the circuit scale required for the format conversion.

What is claimed is:

1. A parallel computer system comprising a host processor and at least one processor element connected to the host processor via a bus, wherein the host processor and the at least one processor element respectively share and calculate each floating-point arithmetic operation contained in a specific calculation process,
    the processor element comprising:
        a floating-point input/output interface section for inputting/outputting floating-point data having a first form composed of a 1-bit sign part, an exponent part having a bit width of me bits and a mantissa part having a bit width of m0 bits;
        an input data converting section for converting the floating-point data having the first form inputted from the floating-point input/output interface section into floating-point data having a second form composed of a 1-bit sign part, an exponent part having a bit width of me bits and a mantissa part having a bit width of output of m1 bits which is greater than m0;
        a floating-point operating section, including multiplying means, for executing the floating-point arithmetic operation for the floating-point data of the second form from the input data converting section; and
        an output data converting section for converting the floating-point data having the second form computed by the floating-point operating section into the floating-point data having the first form and for supplying it to the floating-point input/output interface section.

2. The parallel computer system according to claim 1, wherein
    the input data converting section converts:
        the sign part of the floating-point data having the first form into the sign part of the floating-point data having the second form;
        the exponent part of the floating-point data having the first form into the exponent part of the floating-point data having the second form; and
        the mantissa part of the floating-point data having the first form of m0 bits into the higher order m0 bits within the mantissa part of the floating-point data having the second form of m1 bits and the lower order m1–m0 bits of the mantissa part of the floating-point data having the second form into a predetermined numerical value; and
    the output data converting section converts:
        the sign part of the floating-point data having the second form into the sign part of the floating-point data having the first form;
        the exponent part of the floating-point data having the second form into the exponent part of the floating-point data having the first form; and
        the higher order m0 bit of the mantissa part of the floating-point data having the second form into the mantissa part of the floating-point data having the first form.

3. The parallel computer system according to claim 1, wherein
    the input data converting section converts:
        the sign part of the floating-point data having the first form into the sign part of the floating-point data having the second form;
        the exponent part of the floating-point data having the first form into the exponent part of the floating-point data having the second form; and
        the highest order 1 bit in the mantissa part of the floating-point data having the second form of m1 bits into 1, m0 bit which is lower than the highest order into the mantissa part of the floating-point data having the first form and m1–m0–1 bit which is lower than that into a predetermined numerical value; and
    the output data converting section converts:
        the sign part of the floating-point data having the second form into the sign part of the floating-point data having the first form;
        the exponent part of the floating-point data having the second form into the exponent part of the floating-point data having the first form; and
        m0 bit from the second higher order bit of the mantissa part of the floating-point data having the second form into the mantissa part of the floating-point data having the first form of m0 bit.

4. The parallel computer system according to claim 1, wherein
    the floating-point data having the second form represents signed infinite when the exponent part is a first predetermined value emax and represents zero when the exponent part is a second predetermined value emin,
    floating-point multiplying means contained in the floating-point operating section sets:
        the exponent part of output data at the value emax when an overflow occurs;
        the exponent part of the output data at the value emin when an under-flow occurs;
        the exponent part of the output data at the value emax when either one exponent part of two pieces of the floating-point data having the second form to be inputted is the value emax; and the exponent part of the output data at the value emin when the exponent parts of both of two pieces of the floating-point data having the second form to be inputted are not the value emax and when either one exponent part is the value emin; and floating-point adding/subtracting means contained in the floating-point operating section sets:

the exponent part of output data at the value emax when an overflow occurs;

the exponent part of the output data at the value emin when an under-flow occurs; and the exponent part of the output data at the value emax when either one exponent part of two pieces of the floating-point data having the second form to be inputted is the value emax.

5. The parallel computer system according to claim 1, wherein the multiplying means contained in the floating-point operating section implements truncation in finding a mantissa part of the output data; and a floating-point adding/subtracting means contained in the floating-point operating section implements truncation in finding a mantissa part of the output data.

6. The parallel computer system according to claim 1, wherein the calculation process is a process based on the molecular orbital calculation method.

7. A parallel computing method for sharing and calculating each floating-point arithmetic operation contained in a specific calculation process by a host processor and at least one processor element connected to the host processor via a bus, comprising the steps of:

making the host processor execute an arithmetic operation on floating-point data having a first form composed of a 1-bit sign part, an exponent part having a bit width of me bits and a mantissa part having a bit width of m0 bits;

making the processor element execute a floating-point arithmetic operation on floating-point data having a second form whose precision is higher than that of the first form and which is composed of a 1-bit sign part, an exponent part having a bit width of me bits and a mantissa part having a bit width of m1 bits which is greater than m0;

converting the sign part of the floating-point data input having the first form to be inputted through the bus into the sign part of the floating-point data having the second form, the exponent part of the floating-point data input having the first form into the exponent part of the floating-point data having the second form, and the mantissa part of the floating-point data input having the first form into higher order m0 bits within the mantissa part of the floating-point data having the second form of m1 bits and the lower order m1−m0 bits of the mantissa part of the floating-point data having the second form into a predetermined numerical value to convert the floating-point data input having the first form into the floating-point data having the second form;

executing floating-point arithmetic operation, including multiplying means, on the floating-point data having the second form to obtain floating-point data having the second form as a result of the arithmetic operation; and converting the sign part of the floating-point data having the second form as a result of the arithmetic operation into the sign part of the floating-point data having the first form, the exponent part of the floating-point data having the second form as a result of the arithmetic operation into the exponent part of the floating-point data having the first form, and the higher order m0 bit of the mantissa part of the floating-point data having the second form as a result of the arithmetic operation into the mantissa part of the floating-point data having the first form to convert the floating-point data having the second form as a result of the arithmetic operation into the floating-point data output having the first form and to output to the bus.

8. The parallel computing method according to claim 7, wherein the calculation process is a process based on the molecular orbital calculation method.

9. A parallel computing method for sharing and calculating each floating-point arithmetic operation contained in a specific calculation process by a host processor and at least one processor element connected to the host processor via a bus, comprising the steps of:

making the host processor execute an arithmetic operation on floating-point data having a first form composed of a 1-bit sign part, an exponent part having a bit width of me bits and a mantissa part having a bit width of m0 bits;

making the processing element execute a floating-point arithmetic operation on floating-point data having a second form whose precision is higher than that of the first form and which is composed of a 1-bit sign part, an exponent part having a bit width of me bits and a mantissa part having a bit width of m 1 bits which is greater than m0;

converting the sign part of the floating-point data input having the first form into the sign part of the floating-point data having the second form, the exponent part of the floating-point data input having the first form into the exponent part of the floating-point data having the second form, and the highest order 1 bit in the mantissa part of the floating-point data having the second form of m1 bits into 1, m0 bit which is lower than the highest order into the mantissa part of the floating-point data having the first form and m1−m0−1 bit which is lower than that into a predetermined numerical value to convert the floating-point data input having the first form into the floating-point data having the second form;

executing a floating-point arithmetic operation, including multiplying means, on the floating-point data having the second form to obtain the floating-point data having the second form as a result of the arithmetic operation; and converting the sign part of the floating-point data having the second form as a result of the arithmetic operation into the sign part of the floating-point data having the first form; the exponent part of the floating-point data having the second form as a result of the arithmetic operation into the exponent part of the floating-point data having the first form; and the m0 bit from the second higher order bit of the mantissa part of the floating-point data having the second form as a result of the arithmetic operation into the mantissa part of the floating-point data having the first form of m0 bit to convert the floating-point data having the second form as a result of the arithmetic operation into the floating-point data output having the first form and to output to he bus.

10. The parallel computing method according to claim 9, wherein the calculation process is a process based on the molecular orbital calculation method.

* * * * *